US011740359B2

(12) United States Patent
Lardin et al.

(10) Patent No.: US 11,740,359 B2
(45) Date of Patent: Aug. 29, 2023

(54) PORTABLE PANORAMIC LASER MAPPING AND/OR PROJECTION SYSTEM

(71) Applicant: Mezmeriz, Inc., Ithaca, NY (US)

(72) Inventors: Clifford A. Lardin, Wynnewood, PA (US); Shahyaan Desai, Ithaca, NY (US); Scott G. Adams, Ithaca, NY (US)

(73) Assignee: Mezmeriz, Inc., Ithaca, NY (US)

( * ) Notice: Subject to any disclaimer, the term of this patent is extended or adjusted under 35 U.S.C. 154(b) by 353 days.

(21) Appl. No.: 16/896,139

(22) Filed: Jun. 8, 2020

(65) Prior Publication Data

US 2020/0301016 A1 Sep. 24, 2020

Related U.S. Application Data

(62) Division of application No. 14/747,832, filed on Jun. 23, 2015, now Pat. No. 10,677,924.

(51) Int. Cl.

| *G01S 7/48* | (2006.01) |
| *G01S 7/4915* | (2020.01) |
| *G01S 17/42* | (2006.01) |
| *G01S 7/481* | (2006.01) |
| *G01S 17/34* | (2020.01) |
| *G01S 17/89* | (2020.01) |

(52) U.S. Cl.
CPC ............ *G01S 17/89* (2013.01); *G01S 7/4808* (2013.01); *G01S 7/4817* (2013.01); *G01S 7/4915* (2013.01); *G01S 17/34* (2020.01); *G01S 17/42* (2013.01)

(58) Field of Classification Search
None
See application file for complete search history.

(56) References Cited

U.S. PATENT DOCUMENTS

| 4,611,912 A | 9/1986 | Falk et al. |
| 4,721,385 A | 1/1988 | Jelalian et al. |
| 4,812,035 A * | 3/1989 | Freedman ............... G01S 17/34 |
| | | 342/87 |
| 4,830,486 A | 5/1989 | Goodwin |

(Continued)

OTHER PUBLICATIONS

Non-Final Office Action issued in U.S. Appl. No. 14/747,832, dated Mar. 5, 2018, 11 Pages.

(Continued)

*Primary Examiner* — Eric L Bolda
(74) *Attorney, Agent, or Firm* — Wade IP Law PLLC

(57) ABSTRACT

Techniques are described herein that are capable of forming a depth map and/or projecting an image onto object(s) based on the depth map. A depth map is a three-dimensional representation of an environment. Forming the depth map may utilize a progressive resolution refinement technique. For example, locating information may be determined in accordance with the progressive resolution refinement technique in response to performing a scan of a current point over a field of view. The current point is a point, selected from a plurality of points (e.g., a grid of points) in the field of view, to which a detection beam of light is directed at a respective time as the scan is performed over the field of view. In accordance with this example, the locating information may be coordinated with the scan to form the depth map.

20 Claims, 13 Drawing Sheets

(56) References Cited

U.S. PATENT DOCUMENTS

| | | | |
|---|---|---|---|
| 5,270,780 A * | 12/1993 | Moran | G01S 17/89 356/141.5 |
| 6,753,638 B2 | 6/2004 | Adams et al. | |
| 6,758,983 B2 | 7/2004 | Conant et al. | |
| 6,825,455 B1 | 11/2004 | Schwarte | |
| 7,417,717 B2 | 8/2008 | Pack et al. | |
| 7,576,837 B2 | 8/2009 | Liu et al. | |
| 7,684,019 B2 | 3/2010 | Bonnet et al. | |
| 7,974,443 B2 | 7/2011 | Kipman et al. | |
| 8,125,699 B2 | 2/2012 | Akedo et al. | |
| 8,416,482 B2 | 4/2013 | Desai | |
| 8,643,849 B2 | 2/2014 | Tao et al. | |
| 8,902,408 B2 | 12/2014 | Bridges et al. | |
| 8,964,028 B2 | 2/2015 | Oggier | |
| 9,140,042 B2 | 9/2015 | Erlich | |
| 9,229,106 B2 | 1/2016 | Dotson et al. | |
| 9,268,012 B2 | 2/2016 | Ghosh et al. | |
| 9,426,444 B2 | 8/2016 | Guigues et al. | |
| 9,435,638 B2 | 9/2016 | Chayat | |
| 9,557,630 B1 | 1/2017 | Marason | |
| 9,557,856 B2 | 1/2017 | Send et al. | |
| 9,810,258 B2 | 11/2017 | Erlich | |
| 2008/0018881 A1* | 1/2008 | Hui | G01S 7/4917 356/5.09 |
| 2011/0317235 A1 | 12/2011 | Desai | |
| 2013/0155386 A1 | 6/2013 | Bridges et al. | |
| 2014/0168424 A1 | 6/2014 | Attar et al. | |

OTHER PUBLICATIONS

Non-Final Office Action issued in U.S. Appl. No. 14/747,832, dated Nov. 7, 2018, 13 Pages.

Final Office Action issued in U.S. Appl. No. 14/747,832, dated Jun. 12, 2019, 14 Pages.

Notice of Allowance issued in U.S. Appl. No. 14/747,832, dated Feb. 11, 2020, 5 Pages.

Non-Final Office Action issued in U.S. Appl. No. 14/753,937, dated Dec. 27, 2017, 10 Pages.

Notice of Allowance issued in U.S. Appl. No. 14/753,937, dated Jun. 28, 2018, 7 Pages.

Notice of Allowance issued in U.S. Appl. No. 14/753,937, dated Nov. 5, 2018, 5 Pages.

* cited by examiner

PORTABLE PANORAMIC LASER MAPPING AND/OR PROJECTION SYSTEM

CROSS-REFERENCE TO RELATED APPLICATION(S)

This application is a division of U.S. patent application Ser. No. 14/747,832, filed Jun. 23, 2015 and entitled "Portable Panoramic Laser Mapping and/or Projection System," the entirety of which is incorporated by reference herein.

BACKGROUND

With new developments in areas such as self-driving cars, computer animation, 3D printing, and construction, there is an ever increasing demand for the ability to accurately map an environment (e.g., a person's surroundings) more quickly and/or at lower cost. Lasers are often used to map an environment. However, conventional laser mapping systems typically measure the distance to each point in the environment thousands of times in order to average out noise. Such repetitive measuring may substantially increase an amount of time that is consumed to generate a map and/or a cost associated with generating the map. Moreover, conventional laser mapping systems usually consume a substantial amount of power (e.g., tens of watts) to measure the distances to the points, which are used to generate a map. The relatively high power consumption of such conventional systems may result in a relatively high cost. The relatively high cost and/or time consumption associated with conventional laser mapping systems may render those systems unsuitable for some applications.

SUMMARY

Various approaches are described herein for, among other things, forming a depth map and/or projecting an image onto object(s) based on the depth map. A depth map is a three-dimensional representation of an environment. Forming a depth map may involve scanning a beam of laser light from a central reference location over a grid of points within an environment. For example, at each point within a grid of points, locating information such as distance and velocity is measured. During each measurement, the point being measured is referred to as the current point. Determining distance and/or velocity from the locating information at the current point may utilize a progressive resolution refinement (PRR) technique. In accordance with this example, the locating information may be coordinated with the scan to form the depth map.

An example portable panoramic laser mapping system is described. The portable panoramic laser mapping system includes a depth measurement subsystem, a microelectromechanical systems-based (MEMS-based) scanning subsystem, and a controller. The depth measurement subsystem is configured to measure a distance between a reference location and a current point. The depth measurement subsystem includes a laser source, splitting optics, a light detecting structure, and a signal processing circuit. The laser source is configured to generate coherent light. The coherent light is capable of being modulated. The splitting optics are configured to create a reference beam of light and a detection beam of light from the coherent light. The light detecting structure is configured to convert the reference beam and a reflected detection beam into electrical signals. The reflected detection beam results from reflection of the detection beam from the current point. The signal processing circuit is optionally configured to determine locating information based on the electrical signals in accordance with a progressive resolution refinement technique. The locating information indicates the distance between the reference location and the current point. The MEMS-based scanning subsystem includes mirror(s) and a light redirecting element that has a microelectromechanical structure. The microelectromechanical structure is configured to perform a scan of the current point within a field of view using the mirror(s). The controller is configured to coordinate the locating information with the scan of the current point over the field of view to form a depth map.

An example method of adapting a pixel size and/or a measurement resolution on a pixel-by-pixel basis is described. In accordance with this method, a laser is used to generate an emission of coherent light. The emission is split into a reference beam of light and a detection beam of light. A scan is performed. The scan comprises a series of distance measurements using the detection beam as the detection beam is scanned over a line or over an area. A range of frequencies and/or a period of time over which the emission is modulated during the scan is altered for a subset of the distance measurements in the scan.

In an aspect of this method, a plurality of operations may be performed for each distance measurement in the scan. For instance, the plurality of operations may include modulating the emission over the range of frequencies and over the period of time. The plurality of operations may include orienting the detection beam toward a point on an object. The plurality of operations may include reflecting the detection beam off of the point on the object to provide a reflected detection beam. The plurality of operations may include combining the reference beam and reflected detection beam on a detector to produce an electrical signal. The electrical signal has a beat frequency. The plurality of operations may include signal processing the electrical signal to determine the beat frequency. The beat frequency is a measurement of a distance to the point on the object.

An example method of performing progressive resolution refinement is described. In accordance with this method, a first measurement with a relatively low resolution is performed using an electrically modulated laser source. The first measurement is processed electrically to determine low-resolution locating information. A second measurement with a relatively high resolution is performed. The second measurement is processed electrically using the low-resolution locating information to enable the processing of the second measurement to determine high-resolution locating information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
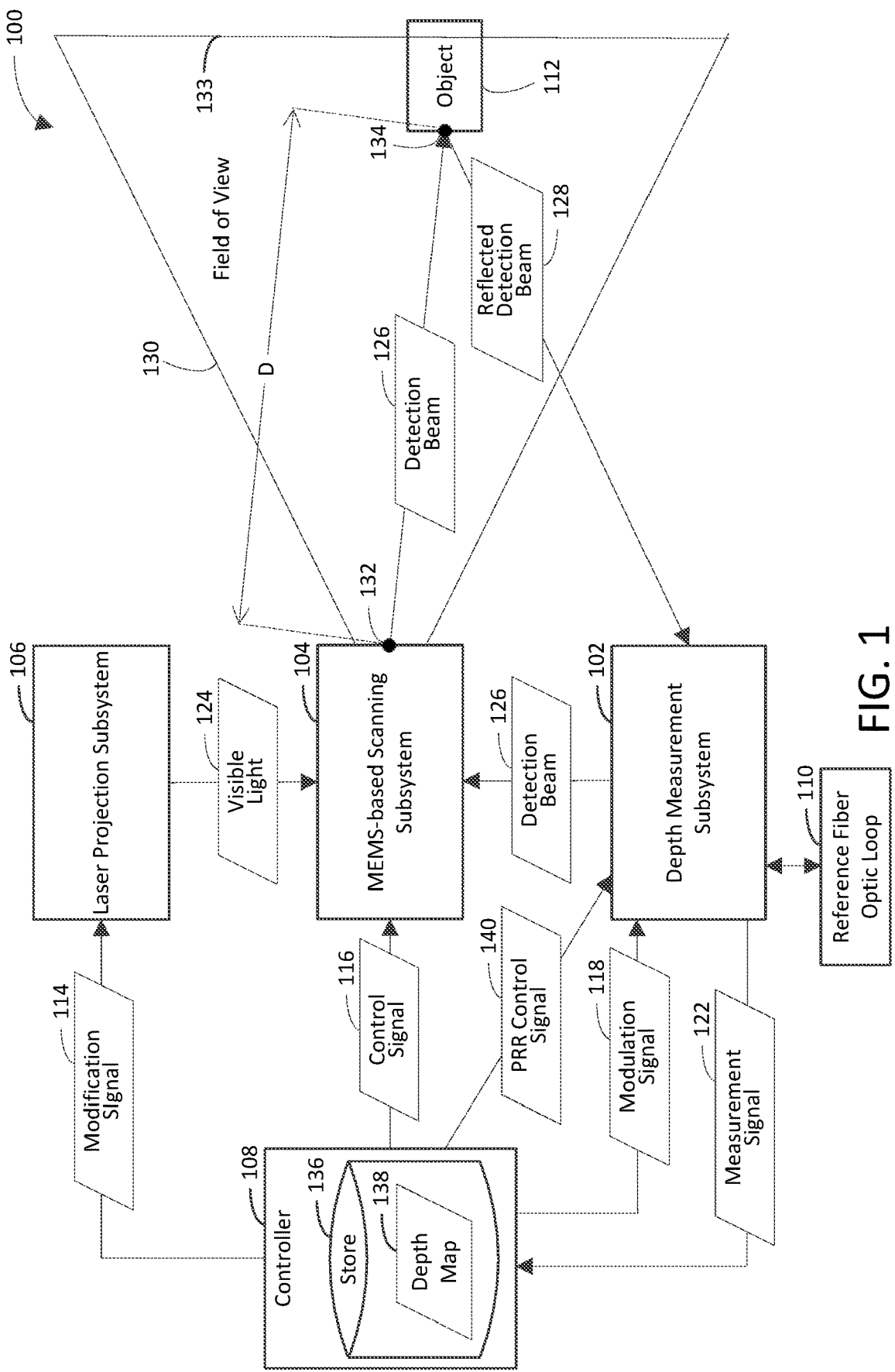
FIG. 1 is a block diagram of an example portable panoramic laser mapping and/or projection system in accordance with an embodiment described herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of forming a depth map and/or projecting an image onto object(s) based on the depth map. A depth map is a graphical three-dimensional representation of an environment. Forming a depth map may involve scanning a beam of laser light from a central reference location over a grid of points within an environment. For example, at each point within a grid of points, locating information such as distance and velocity is measured. During each measurement, the point being measured is referred to as the current point. Determining distance and or velocity from the locating information at the current point may utilize a progressive resolution refinement (PRR) technique. In accordance with this example, the locating information may be coordinated with the scan to form the depth map.

Example techniques described herein have a variety of benefits as compared to conventional laser mapping techniques and conventional laser projection techniques. For instance, the example mapping techniques may be capable of accurately mapping an environment more quickly and/or at lower cost than conventional laser mapping techniques. As an illustration, the example mapping techniques may take one or two measurements per point in in the environment; whereas, conventional techniques may take thousands of measurements per point. The example mapping techniques may reduce an amount of time that is consumed to generate a map and/or a cost associated with generating the map, as compared to conventional laser mapping techniques. The example mapping techniques may require less (e.g., substantially less) laser power output than conventional laser mapping techniques. For example, the example mapping techniques may require less than 1 Watt of laser output power; whereas, the conventional laser mapping techniques may require tens of watts. In an aspect of this example, the example mapping techniques may output less than 1 watt (W) while maintaining a detectable signal at a target distance of at least 200 m, 300 m, 400 m, or 500 m. The example projection techniques may be capable of modifying an image that is to be projected on object(s) in the field of view within a range of 0.1-10 m to compensate for variations in surface(s) of the object(s).

The example portable panoramic laser mapping systems described herein may be characterized by a relatively low manufacturing cost. For instance, the described portable panoramic laser mapping systems may be made using commoditized lasers. The portable panoramic laser mapping systems may combine a depth measurement subsystem, a microelectromechanical systems-based (MEMS-based) scanning subsystem, and a controller into a single portable package. In an example implementation, a laser projection subsystem also may be included in the single portable package. The depth measurement subsystem, the MEMS-based scanning subsystem, and/or the laser projection subsystem may share circuitry, thereby further reducing the manufacturing cost of the described portable panoramic laser mapping systems.

The example portable panoramic laser mapping systems may be usable in more applications than conventional laser mapping systems and conventional laser projection systems. For instance, combining laser mapping functionality (e.g., mapping surroundings) and laser projection functionality (e.g., projecting images overlaid on the mapped surroundings) within a portable panoramic laser mapping system enables the portable panoramic laser mapping system to be used in applications beyond those in which a laser mapping system or a laser projection system alone may be used. For example, the device may be used in a construction application in which images of proposed remodeling designs, hidden facilities, or drill patterns or illumination to install equipment, such as an HVAC aperture, in a structure are overlaid on objects (e.g., walls) inside the structure. In another example, the device may be used to take a relatively detailed 3D scan of a small object (such as a coffee mug) and print meta-information on the object or in a vicinity of the object to indicate how to order another one or more of the object, and further optionally capture feedback from a user via gesture or other detected motion within the device's field of view.

In order to achieve a lowest-cost design point without sacrificing performance, the example techniques described herein may provide improvements in multiple areas, as compared to conventional techniques. For instance, through the use of a progressive resolution refinement technique, the example techniques may reduce complexity and/or cost of signal processing, as compared to conventional techniques. Through the use of flexural-based MEMS systems, the example techniques may achieve a substantially lower scanning cost than conventional techniques. The example techniques may utilize higher-performance MEMS materials to achieve relatively wide scan angles.

FIG. 1 is a block diagram of an example portable panoramic laser mapping and/or projection system 100 (hereinafter "system 100") in accordance with an embodiment described herein. Generally speaking, system 100 operates to perform laser mapping and/or projection. For example, system 100 may perform laser mapping to form a depth map, which is a three-dimensional representation of an environment. In another example, system 100 may perform laser projection to project an image onto object(s) based on such a depth map. It will be recognized that projection (a.k.a. image projection or laser projection) as described herein is a generalization of projecting any visible two-dimensional information, including but not limited to a single still image, multiple still images, video data, and/or partially or fully synthesized visible information (e.g., augmented reality). Detail regarding techniques for performing laser mapping and/or projection is provided in the following discussion.

As shown in FIG. 1, system 100 includes a depth measurement subsystem 102, a microelectromechanical systems-based (MEMS-based) scanning subsystem 104, a laser projection subsystem 106, a controller 108, and a reference fiber optic loop 110. Depth measurement subsystem 102 is configured to measure a distance between a reference location 132 and a current point 134 in a field of view 130. For instance, depth measurement subsystem 102 provides a detection beam 126, which is split from coherent light, to MEMS-based scanning subsystem 104 so that MEMS-based scanning subsystem 104 may provide the detection beam 126 from the reference location 132 to the current point 134. Depth measurement subsystem 102 receives a reflected detection beam 128, which results from reflection of the detection beam 126 from the current point 134 at a surface of an object 112. Depth measurement subsystem 102 compares a representation of the reflected detection beam 128 and a representation of a reference beam, which is split from the coherent light, to determine locating information. The locating information includes a measurement of the distance between the reference location 132 and the current point 134.

Depth measurement subsystem 102 is capable of modulating the coherent light from which the detection beam 126 and the reference beam are split. For example, depth measurement subsystem 102 may modulate the coherent light based on a modulation signal 118 that is received from controller 108. In accordance with this example, the modulation signal 118 may indicate a type of modulation (e.g., amplitude modulation or frequency modulation) to be applied to the coherent light and/or a manner in which such modulation is to be applied (e.g., the amplitudes and/or frequencies to be used). Depth measurement subsystem 102 may provide a measurement signal 122 to controller 108. For instance, the measurement signal 122 may include information regarding the distance between the reference location 132 and the current point 134.

Depth mapping using coherent light can take any of a variety of forms in amplitude and/or frequency modulation techniques. Given the superior noise rejection capability and reduced issues with multiple reflections compared to amplitude modulation techniques, the discussion herein is focused more on frequency modulation techniques. However, it will be recognized that the embodiments described herein may utilize any suitable amplitude and/or frequency modulation techniques. Some example techniques for achieving Frequency Modulated Continuous Wave (FMCW) depth mapping are described in U.S. Pat. No. 4,611,912 to Falk et al. and U.S. Pat. No. 4,830,486 to Goodwin, both of which are incorporated herein by reference in their entireties.

MEMS-based scanning subsystem 104 is configured to scan the current point 134 over the field of view 130. During the scan, MEMS-based scanning subsystem 104 provides the detection beam 126 from the reference location 132 to the current point 134, causing the reflected detection beam 128 to be reflected toward depth measurement subsystem 102. The detection beam 126 travels a distance D before coming into contact with object 112 at the current point 134.

Laser projection subsystem 106 is configured to project an image onto object(s), such as object 112, by raster scanning a beam of modulated laser light typically sourced from the combination of one to three visible laser outputs. U.S. Pat. No. 8,416,482 to Desai et al., the entirety of which is incorporated herein by reference, presents such a projection system. The combined output is referred to as visible light 124. Laser projection subsystem 106 may project the image in response to receiving a modification signal 114 from controller 108. For example, the modification signal 114 may include a modified version of the image. In another example, the modification signal 114 may include attribute(s) and/or instructions for the laser projection subsystem 106 to modify the image prior to projection of the image onto the object(s). For instance, the image may be modified to compensate for variations in distances between the reference location 132 and the surface(s) of the object(s).

Controller 108 is configured to coordinate the locating information with the scan of the current point over the field of view 130 to form a depth map 138. Controller 108 is shown in FIG. 1 to include a store 136 for storing the depth map 138 for illustrative purposes and is not intended to be limiting. It will be recognized that controller 108 need not necessarily include a store 136.

Controller 108 may be further configured to control depth measurement subsystem 102, MEMS-based scanning subsystem 104, and/or laser projection subsystem 106. For instance, controller 108 may control any one or more of the aforementioned subsystems 102, 104, and 106 based on measurement 122. In one example implementation, controller 114 generates the modification signal 114 in response to receipt of measurement 122 from depth measurement subsystem 102. For example, controller 108 may generate the modification signal 114 to accommodate the distance between the reference location 132 and the current point 134, as reflected by measurement 122. In another example implementation, controller 108 controls MEMS-based scanning subsystem 104 using control signal 116. For instance, controller 108 may use the control signal 116 to control a rate at which MEMS-based scanning subsystem scans the current point 134 over the field of view 130. In another example implementation, controller 108 controls depth measurement subsystem 102 using progressive resolution refinement control signal 140. For instance, controller 108 may use the progressive resolution refinement control signal 140 to control the electronic signal processing of the locating information associated with the current point 134.

Controller 108 may be configured to calibrate depth measurement subsystem 102. For example, controller 108 may be configured to calibrate depth measurement subsystem 102 using a measurement of the distance from the reference location 132 to a reference object (e.g., object 112) in the field of view 130. In accordance with this example, the distance from the reference location 132 to the reference object in the field of view 130 is a known distance. For instance, the distance from the reference location 132 to the reference object may be known prior to the measurement of the distance from the reference location 213 to the reference object being taken.

In another example, controller 108 uses reference fiber optic loop 110 to calibrate depth measurement subsystem 102. In accordance with this example, controller 108 calibrates depth measurement subsystem 102 using a measurement of the distance through reference fiber optic loop 110. In further accordance with this example, the distance through reference fiber optic loop 110 is a known distance. For instance, the distance through reference fiber optic loop 110 may be known prior to the measurement of the distance through reference fiber optic loop 110 being taken. The distance through reference fiber optic loop 110 may be measured simultaneously with the measurement of the distance from the reference location 132 to each current point 134 in the field of view 130, though the scope of the example embodiments is not limited in this respect.

Controller 108 may calibrate depth measurement subsystem 102 once per N measurements of the current point 134 in the field of view 130, N times per linear scan of the current point 134 in the field of view 130, N times per scan of the entire field of view 130, once per N scans of the entire field of view 130, etc. N is an integer (e.g., a predetermined integer), such as 1, 2, 3, 4, or 5.

In an example embodiment, controller 108 utilizes the depth map 138 to provide a modified image. In accordance with this embodiment, laser projection subsystem 106 is configured to generate the visible light 124 for projecting the modified image onto object(s), such as the object 112. In an aspect of this embodiment, laser projection subsystem 106 may use a light redirecting element in MEMS-based scanning subsystem 104 that is configured to perform the scan of the current point 134 over the field of view 130 to project the modified image onto the object(s). In another aspect of this embodiment, MEMS-based scanning subsystem 104 may further include a second light redirecting element, which is different from the light redirecting element configured to perform the scan of the current point 134 over the field of view 130. In accordance this this aspect, laser projection subsystem 106 uses the second light redirecting element in MEMS-based scanning subsystem 104 to project the modified image onto the object(s).

Controller 108 may be configured to determine velocity of at least one point in the field of view 130 based on the locating information. For example, controller 108 may be configured to determine a gesture based on velocities of at least two points in the field of view 130. In an aspect of this example, controller 108 may determine the gesture based on a relative velocity between the at least two points. Examples of a gesture include but are not limited to a hand being waved and a finger being pointed. Controller 108 may be configured to determine that an object is moving relative to the system 100 and/or a rate at and/or a direction in which an object is moving relative to system 100.

It will be recognized that system 100 may not include one or more of depth measurement subsystem 102, MEMS-based scanning subsystem 104, laser projection subsystem 106, controller 108, and/or reference fiber optic loop 110. Furthermore, system 100 may include components in addition to or in lieu of depth measurement subsystem 102, MEMS-based scanning subsystem 104, laser projection subsystem 106, controller 108, and/or reference fiber optic loop 110.

Figure 2:
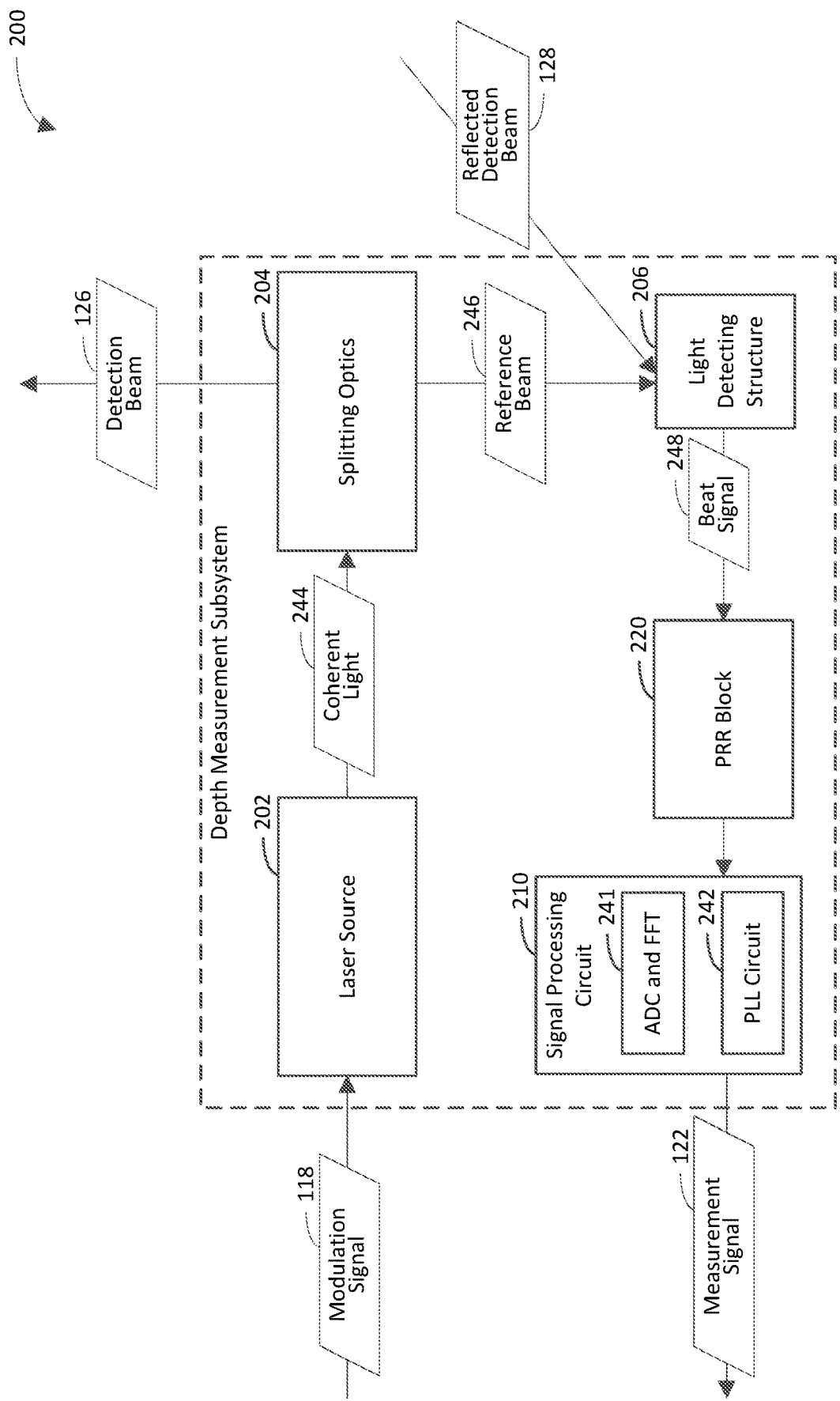
FIG. 2 depicts an example implementation of a depth measurement subsystem shown in FIG. 1 in accordance with an embodiment described herein.

FIG. 2 is a block diagram of an example depth measurement subsystem 200 in accordance with an embodiment described herein. Depth measurement subsystem 200 is an example implementation of a depth measurement subsystem 102 shown in FIG. 1. Depth measurement subsystem 200 includes a laser source 202, splitting optics 204, a light detecting structure 206, progressive resolution refinement (PRR) circuitry 220, and a signal processing circuit 210.

Laser source 202 is configured to generate coherent light 244. For instance, the coherent light 244 may be an infrared laser with emission wavelengths between 800 nm-2000 nm. In accordance with this example, the infrared laser may have a wavelength of 850 nanometers (nm), 940 nm, 1310 nm, 1550 nm, or any other suitable value. For instance, wavelengths from 1300 to 2000 nm may provide reduced absorption and scattering from dust. The output power of laser source 202 may be less than 100 milliwatts (mW) for mapping regions of 10 m or less. For regions in excess of 10 m, higher powers may be needed to achieve sufficiently high reflected signals for determining locating information.

Laser source 202 is capable of modulating the coherent light 244. For instance, laser source 202 may modulate the coherent light 244 in frequency and/or amplitude. Laser source 202 may modulate the coherent light 244 in response to (e.g., based on) receipt of the modulation signal 118, though the scope of the example embodiments is not limited in this respect. By modulating a current supply to laser source 202, the wavelengths of the coherent light 244 can be swept anywhere from thousandths of a nanometer to multiple nanometers. The sweep in wavelength can produce large changes in the optical emission frequency. As an example, tenths of a nanometer corresponds to several gigahertz (GHz) changes in optical emission frequency.

In the case of frequency modulation, the modulation signal 118 may be swept over a linear saw-tooth profile with a period in a range of 5 nanoseconds (ns) to 500 milliseconds (ms). Frequency modulation changes in a range of 150 MHz to 150 GHz may be utilized depending on the speed and range resolution that are needed.

There are many ways to modulate amplitude and/or frequency of a laser's emission. For that reason, we refer to the combination of the laser and the modulator as the laser source 202 herein for the purpose of discussion. An example for frequency modulation would be a distributed feedback laser (DFB) diode laser powered by a current source. By linearly ramping the current source output in time, the frequency of the laser's emission can be linearly modulated. Varying the temperature of a diode laser is yet another way to modulate a diode laser's emission frequency, though it may not be well suited for the time constants associated with depth mapping. An example for amplitude modulation would be a diode laser followed by an optical chopper.

Splitting optics 204 are configured to create a reference beam 246 of light and the detection beam 126 of light from the coherent light 244. For instance, splitting optics 204 may collimate and optically split the coherent light 244 to create the reference beam 246 and the detection beam 126. Accordingly, splitting optics 204 may include collimation optics, a splitter to split the coherent light 244, and one or more polarizing filters for altering the detection beam 126 and/or the reference beam 246 for proper interaction between the reflected detection beam 128 and the reference beam 246 at a surface of light detecting structure 206.

Light detecting structure 206 is configured to convert the reference beam 246 and the reflected detection beam 128 into electrical signals. The reflected detection beam 128 results from reflection of the detection beam 126 from the current point 134, as shown in FIG. 1. The electrical signals may include a beat signal 248. For instance, when the reference beam 246 and the reflected detection beam 128 combine at light detecting structure 206, the beat signal 248 is produced. The beat signal 248 is an electrical result of optical mixing of the reference beam 246 and the reflected detection beam 128 at a surface of light detecting structure 206.

In an example embodiment, depth measurement subsystem 200 is configured to perform Frequency Modulated Continuous Wave (FMCW) depth mapping with a linear ramp in frequency over an interval Δf, referred to as a chirp frequency excursion. In accordance with this embodiment, the beat signal 248 has a beat frequency, which represents a measurement of the distance between the reference location 132 and the current point 134. The beat frequency is directly proportional to the distance D traveled by the detection beam 126, as shown in FIG. 1, in accordance with the following equation:

$$f_{beat} = 2\left(\frac{D * \Delta f}{c * T}\right) \quad \text{(Equation 1)}$$

where D is the distance from the reference location 132 to the current point 134; c is the speed of light; and T is the duration of the linear frequency ramp (i.e., "chirp period").

FMCW signals facilitate the determination of both the distance between the reference location 132 and each current point 134 in the field of view 130, and the speed of a point in the field of view 130 as it moves relative to the reference location 132 due to the Doppler effect. To carry out both distance and speed measurements, a saw-tooth profile with rising and falling linear ramps in frequency may be used. Two beat frequencies may be created whose average and difference can be used to compute both relative speed (e.g., velocity) of an object (e.g., object 112) and distance to the object. FMCW allows ranging with resolution proportional to the bandwidth (Δf/ΔT) within the pulse window, allowing range to be determined with a single pulse per point in the field of view 130.

Light detecting structure 206 may be configured in many ways. For example, light detecting structure 206 may be mounted adjacent to MEMS-based scanning subsystem 104 and may receive light from the field of view 130. In another example, light detecting structure 206 may be positioned in the optical path of splitting optics 204 and may receive only light from the field of view 14 that passes back through MEMS-based scanning subsystem 104. In yet another example, light detecting structure 206 may be integrated onto MEMS-based scanning subsystem 104 as part of a composite mirror system through a layer transfer process. In accordance with this example, the medium of light detecting structure 206, which may be specially designed, may be bonded to MEMS-based scanning subsystem 104 for both mechanical and electrical connection.

Light detecting structure 206 may be made out of any of a variety of types of devices, depending on the application and the wavelengths of the coherent light 244 being used for depth measurement. Example devices that may be used to make light detecting structure 206 include but are not limited to an avalanche photodiode, a Metal-Semiconductor-Metal Schottky photodiode, a photoconductive switch, and an ultra-fast p-i-n photodiode.

Equation 1 reveals the proportional relationship between the chirp frequency excursion and the beat frequency. As an example, consider the case of a 10 m distance, a 20 GHz chip range, and a chirp duration of 1 microseconds (μs). This set of conditions would produce a 1.33 GHz beat frequency. Although it is possible to measure such a frequency, electronics used to process signals below 500 MHz typically are much less expensive. To reduce the signal processing requirements, one could reduce the chirp frequency excursion to 2 GHz; however, there is a resulting penalty in range resolution according the following equation:

$$\delta R = \frac{c}{2 * \Delta f} \quad \text{(Equation 2)}$$

where δR is the range resolution; Δf is the chirp frequency excursion; and c is the speed of light. It can be seen from Equation 2 that a 10×reduction in chirp frequency excursion results in a 10×increase in the minimum range resolution. If in the example above, the chirp frequency excursion were decreased to 2 GHz, the resulting beat frequency would be decreased to 133 MHz; however, the range resolution would be negatively impacted by a factor of 10. The progressive resolution refinement technique was designed to achieve the higher range resolution depth maps, but at a substantially lower cost and/or complexity of system 100.

A progressive resolution refinement technique is a technique in which a first (e.g., relatively lower-resolution) measurement is determined, and a second (e.g., relatively higher-resolution) measurement is determined utilizing the first measurement. By utilizing the first measurement to perform the second measurement, the cost and/or complexity of system 100 may be substantially lowered.

Figure 2A:
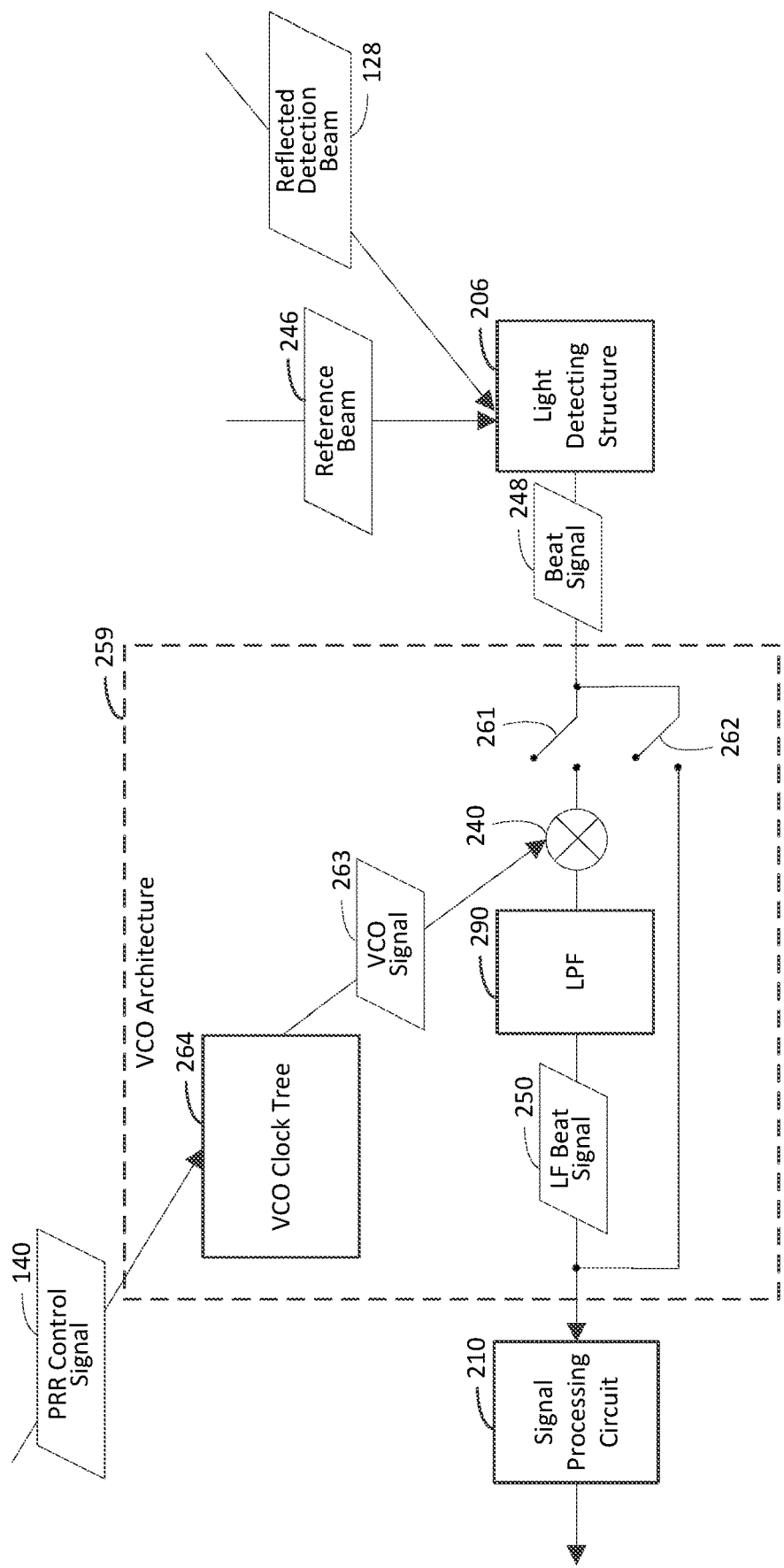
FIG. 2a depicts an example implementation of a voltage-controlled oscillator (VCO) architecture in accordance with an embodiment described herein.

For example, in one embodiment of progressive resolution refinement, a first measurement may be performed where modulation signal 118 modulates laser source 202 to produce a 2 GHz chirp frequency excursion, which as shown in the prior example, results in a beat signal 248 having a 133 MHz beat frequency for an example current point with a 10 m distance from the reference location 132. Processing of the locating information from the beat signal 248 starts with progressive resolution refinement block 220 shown in FIG. 2, and detailed in FIG. 2a. Referring to FIG. 2a, for the first measurement, switch 261 would be opened and switch 262 would be closed in order to bypass high frequency signal mixer 240 and feed directly into signal processing circuit 210. Signal processing circuit 210 may include element 241, which includes an analog-to-digital conversion circuit coupled with a digital-signal-processing (i.e., DSP) block that carries out a fast Fourier transform (i.e., FFT), to determine the value of the beat frequency in the beat signal 248. In another embodiment, signal processing circuit 210 may include a phased-locked loop (i.e., PLL) circuit 242 to determine a measure of the beat frequency in the beat signal 248, a measure being the voltage required to lock the phased locked-loop's internal voltage controlled oscillator on the beat frequency. It will be recognized that depth measurement subsystem 200 need not necessarily include element 241 and/or PLL circuit 242.

A second measurement using the progressive resolution refinement technique may be performed where modulation signal 118 modulates laser source 202 to produce a 20 GHz chirp frequency excursion, which as shown in the prior example, results in a beat signal 248 having a 1.33 GHz beat frequency for an example current point with a 10 m distance from the reference location 132. In this second measurement, switch 261 would be closed and switch 262 would be opened in order to send the beat signal with the higher beat frequency through high frequency signal mixer 240. Based on the results of the first measurement, controller 108 may send progressive resolution refinement control signal 140 to select a voltage-controlled oscillator (VCO) signal 263 from a VCO clock tree 264. When VCO signal 263 is mixed with beat signal 248 using high frequency signal mixer 240, low frequency beat signal 250 results. Low pass filter (i.e. LPF) 290 is used to filter out other signal products of signal mixer 240 not related to the low frequency beat signal 250. Low frequency beat signal 250 has a beat difference frequency equal to the difference between the frequency of the VCO signal 263 and the beat frequency of the beat signal 248. Beat difference frequency of low frequency beat signal 250 is a measure of the distance to the current point 134. Signal processing circuit 210 may be used to construct measurement 122 from the beat difference frequency of low frequency beat signal 250. For example, signal processing circuit 210 may use the aforementioned PLL or FFT circuits to determine the value of the beat difference frequency of low frequency beat signal 250.

VCO clock tree 264 may include a progression of VCO clock signals, wherein the difference in frequency between any two successive VCO clock signals are within the signal processing capabilities of signal processing circuitry 210. Based on the results of the first measurement, controller 108 may have sufficient information to predict the expected beat frequency of beat signal 250 during the second measurement and thereby select the appropriate VCO clock signal 263 to produce low frequency beat signal 250 that is within the signal processing capabilities of signal processing circuitry 210.

The same process may be used for all the other pixels within the field of view. For example, the locating information for each pixel may be determined in a first (e.g., relatively lower-resolution) measurement to bin the approximate distance for each pixel and then using the approximate distance from the first measurement, perform a second (e.g., relatively high-resolution) measurement to obtain more accurate and/or precise locating information.

Figure 2B:
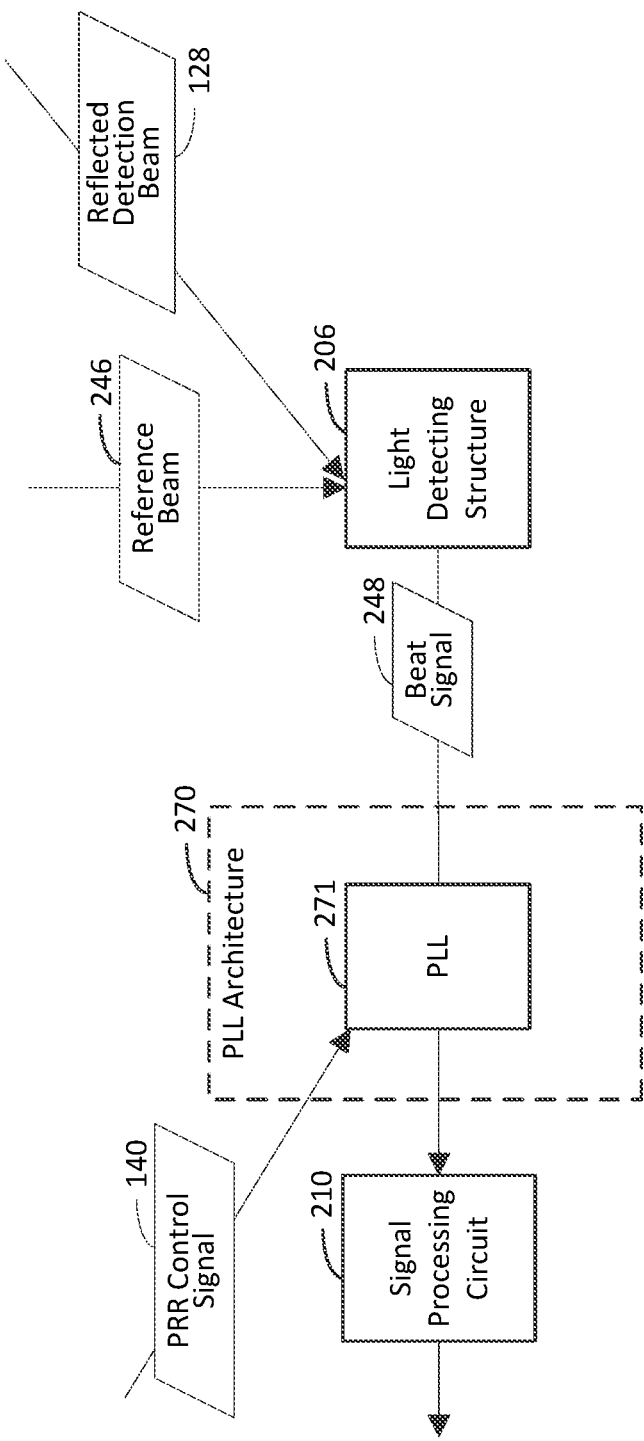
FIG. 2b depicts an example implementation of a phase-locked loop (PLL) architecture in accordance with an embodiment described herein.

In another embodiment of progressive resolution refinement, the phased locked loop architecture 270 shown in FIG. 2b is used. Referring to FIG. 2b, in order to determine locating information from the beat signal 248, the beat signal 248 is fed into a PLL circuit 271. Controller 108 may send progressive resolution refinement control signal 140 to PLL circuit 271 in order to set the center frequency of the phased locked loop such that the PLL circuit 271 can lock on the beat frequency of the beat signal 248. Without high expense or complexity, for a single fixed center frequency, it is unlikely that PLL circuit 271 could be designed to span relatively high and relatively low resolution measurements over ranges of 50 m, 100 m, 200 m, 300 m, 400 m, or 500 m. In such examples, beat frequencies may need to be measureable from 10 MHz to 50 GHz. High frequency PLL circuits exist, but the range of frequencies over which the PLL can rapidly lock is typically limited. In an example embodiment of progressive resolution refinement, the phased locked loop architecture 270 does not need to span the entire range.

For example, a first measurement may be performed with a relatively low resolution where the modulation signal 118 modulates laser source 202 to produce a 2 GHz chirp frequency excursion, which as shown before, results in a beat signal 248 having a 133 MHz beat frequency for an example current point with a 10 m distance from the reference location 132. Processing of the locating information from the beat signal 248 starts with the progressive resolution refinement block 220 detailed in FIG. 2b. For the first measurement, controller 108 may provide a progressive resolution refinement control signal 140 to PLL circuit 271 to set a low center frequency thereby enabling PLL circuit 271 to lock onto relatively low beat frequency of the beat signal 248. Signal processing circuit 210 may include an analog-to-digital conversion circuit to measure the control voltage for the voltage controlled oscillator within PLL circuit 271, the control voltage being a measure of the beat frequency of the beat signal 248. Furthermore, the beat frequency provides a measure of the distance to the current point 134.

A second measurement using the progressive resolution refinement technique may be performed where modulation signal 118 modulates laser source 202 to produce a 20 GHz chirp frequency excursion, which as shown in the prior example, results in a beat signal 248 having a 1.33 GHz beat frequency for an example current point with a 10 m distance from the reference location 132. Based on the results of the first measurement, controller 108 may have sufficient information to predict the expected beat frequency of the low frequency beat signal 250 during the second measurement and thereby select the appropriate PLL center frequency for PLL circuit 271 to enable it to lock on to the beat frequency of the beat signal 248. Controller 108 may set the appropriate PLL center frequency for PLL circuit 271 using the progressive resolution refinement control signal 140. Signal processing circuit 210 may include an analog-to-digital conversion circuit to measure the control voltage for the voltage controlled oscillator within PLL circuit 271, the control voltage being a measure of the beat frequency of the beat signal 248. Signal processing circuit 210 may be used to construct measurement 122 from the measure of the beat frequency of the beat signal 248.

It will be recognized that depth measurement subsystem 200 need not necessarily include VCO clock tree 264, signal mixer 240, and/or phased locked loop architecture 270 to enable the progressive resolution refinement technique. Other circuit topologies to accomplish the measurement task are possible and known to those skilled in the art of circuit design. Furthermore, the first measurement need not be a measurement of the current point 134. Instead, the first measurement may be an estimate of the distance from the reference location 132 to the current point 134 based on measurements of one or more other points within the field of view (e.g., another point that is adjacent to the current point 134).

In an example progressive resolution refinement technique embodiment, the first measurement of the distance between the reference location 132 and the current point 134 is used to narrow a frequency range over which the beat frequency is to be searched in the second measurement by more than a factor of two. For example, in one embodiment, if a relatively high resolution second measurement produces a beat frequency of a beat signal 248 of 2.5 GHz, VCO architecture 259 shown in FIG. 2a may produce a low frequency beat signal 250 with a difference beat frequency of 500 MHz, 500 MHz being more than a factor of two reduction from the original 2.5 GHz beat frequency. In another embodiment, for example, if a relatively high resolution second measurement produces a beat frequency of a beat signal 248 of 2.5 GHz, PLL circuit 271 shown in FIG. 2b may be controlled by progressive resolution refinement signal 140 to have a center frequency near 2.5 GHz. Furthermore, PLL circuit 271 may have a frequency lock range of 500 MHz, 500 MHz being a range of frequencies more than a factor of two reduction from the original 2.5 GHz beat frequency.

In an aspect of this embodiment, laser source 202 shown in FIG. 2 is configured to perform a periodic chirp in which the coherent light 244 is modulated (e.g., linearly) in frequency over a chirp period of time and over a chirp frequency excursion. In accordance with this aspect, controller 108 may be configured to adjust the chirp frequency excursion to adapt resolution of the locating information. Controller 108 may be configured to adapt the resolution for a single point within a scan, a subset of the points within a scan, or all of the points within a scan.

In one example of this implementation, the current point 134 has a pixel size, which is a distance over which the current point 134 scans during the chirp period. In the MEMS-based scanning subsystem 104 described above with reference to FIG. 1, one or more of the axes may be driven at mechanical resonance. Accordingly, if a constant chirp period were used, the effective pixel size may vary throughout the scan due to the sinusoidal motion of the microelectromechanical structure therein. One technique for rectifying this issue is to adapt the chirp period to the angular velocity of the microelectromechanical structure to maintain a constant pixel size or a specified pixel size. According to Equation 1, as a secondary result, the beat frequency of the beat signal 240 will be modified as the chirp period is modified. In accordance with this technique, the progressive range resolution circuitry in VCO architecture 259 shown in FIG. 2a could accommodate this chirp period modification by stretching or compressing the base VCO within the VCO clock tree 264. In doing so, each VCO signal 263 selected would accommodate a constant range of distances despite varying chirp periods.

Other frequency modulation schemes may be used, in addition to or in lieu of the FMCW scheme described above. For instance, Amplitude Modulated Continuous Wave (AMCW) is another scheme in which laser modulation can be utilized to determine both the relative speed of an object and distance to the object.

In AMCW, one or more simultaneous carrier signals in the form of fundamental sinusoidal modulation or pulse trains are emitted by laser source 202. The modulation frequencies are chosen based on an unambiguous range to the object. Multiple frequencies of varying amplitude ratios may be emitted either simultaneously or in a predefined sequence to facilitate enhanced range resolution and determination of relative reflectivity of surfaces of the object.

In an embodiment of the AMCW technique, in accordance with the progressive resolution refinement technique, for a first measurement of each point in the entire field of view 130, each point may first be scanned using a modulation frequency chosen as the maximum frequency for the maximum unambiguous range for which the system is configured to operate. Locating information from this first measurement will necessarily be of lower resolution; however, using the locating information from the first measurement, a second measurement may employ different modulation frequencies either emitted simultaneously or in a predefined sequence to obtain a relatively higher resolution measurement.

In both the first measurement and the second measurement, the distance to a given point in the field of view 130 may be given by the instantaneous phase angle of a demodulated representation of the reflected detection beam. Demodulation and determination of the instantaneous phase angle may be accomplished through digital signal processing or through analog homodyne mixing in an I/Q detector.

Figure 2C:
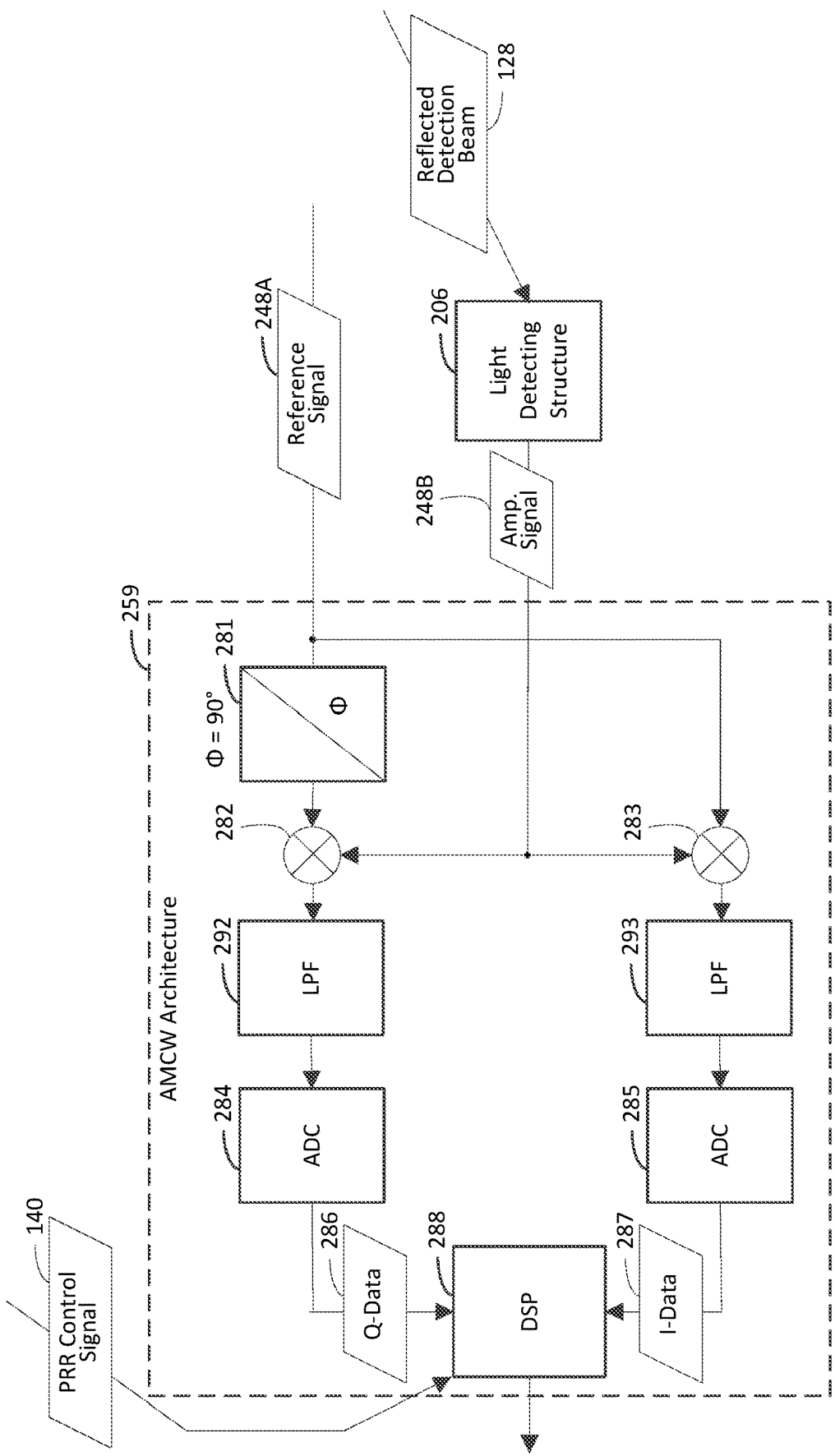
FIG. 2c depicts an example implementation of an amplitude modulated continuous wave (AMCW) architecture in accordance with an embodiment described herein.

For example, FIG. 2c shows an AMCW architecture 259 in accordance with the progressive resolution refinement technique. As shown in FIG. 2c, multiple changes to system 100 are made to accommodate AMCW compared to FMCW, including but not limited to reference beam 248 becomes reference signal 248A, which is an electrical representation of the amplitude modulation signal; only reflected detection beam 128 impinges upon light detecting structure 206; and beat signal 248 becomes amplitude signal 248B.

Internal to the AMCW architecture 259 is an I/Q detector. Reference signal 248A provides the reference for multipliers 282 and 283. After multipliers 282 and 283, low pass filter (i.e. LPF) 292 and LPF 293 pass the low frequency phase information. On one leg of the I/Q detector, phase delay 281 is used to provide the quadrature signal reference to multiplier 282. Analog-to-digital converter (i.e., ADC) 284 and ADC 285 digitize the analog signals and provide Q-Data 286 and I-Data 287, respectively. From Q-Data 286 and I-Data 287, digital signal processor (DSP) 288 is able to compute the relative phase between the reference signal 248A and the reflected detection beam 128, the relative phase being a measure of the distance to the current point 134. DSP 288 utilizes the first measurement and the second measurement in order to determine the relatively high-resolution locating information contained within measurement 122.

AMCW architecture 259 is shown to include an I/Q detector for illustrative purposes and is not intended to be limiting. It will be recognized that there are a variety of techniques for determining the phase of an AMCW signal.

Figure 3:
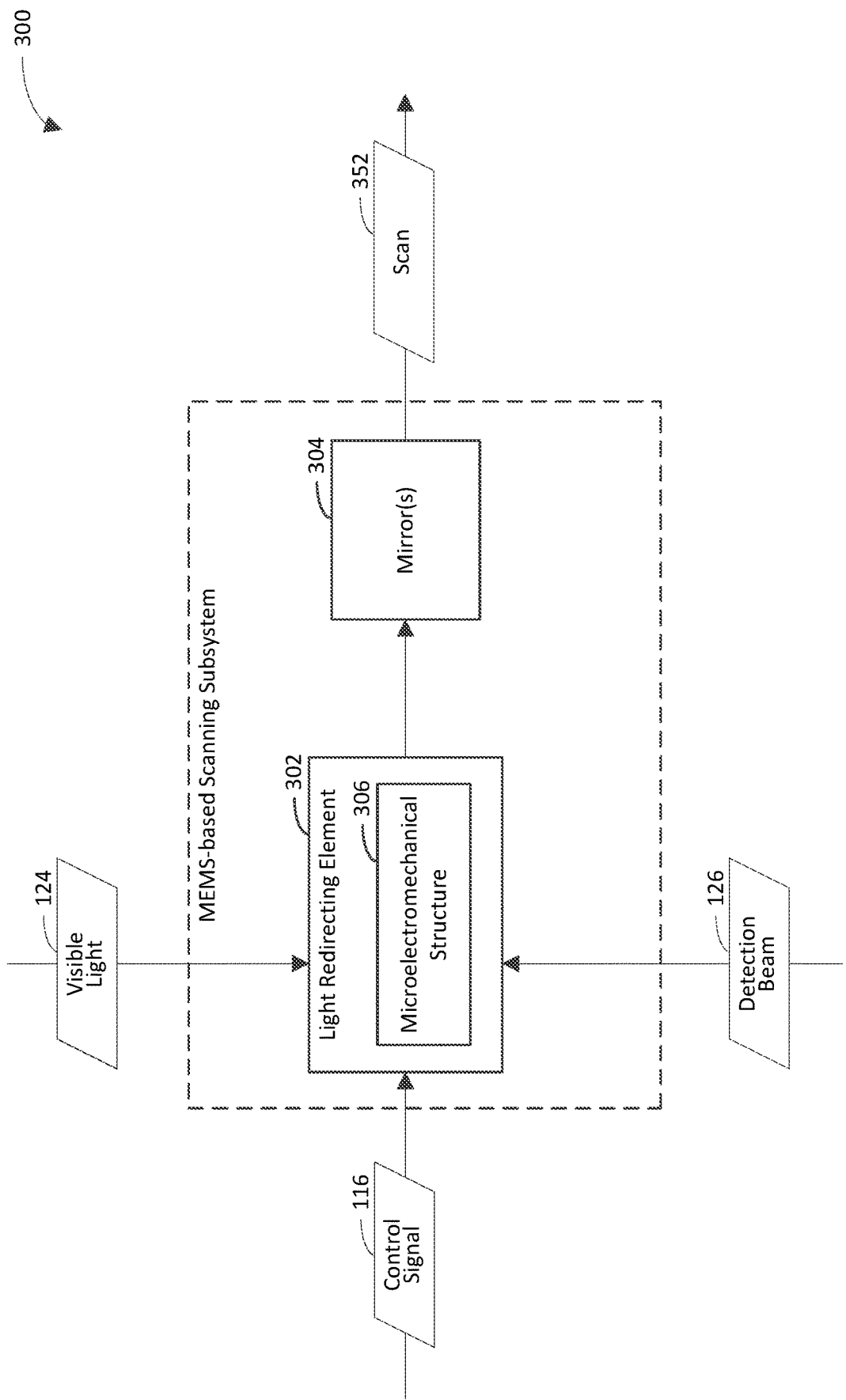
FIG. 3 depicts an example implementation of a microelectromechanical systems-based (MEMS-based) scanning subsystem shown in FIG. 1 in accordance with an embodiment described herein.

FIG. 3 is a block diagram of an example microelectromechanical systems-based (MEMS-based) scanning subsystem 300 in accordance with an embodiment described herein. MEMS-based scanning subsystem 300 is an example implementation of a MEMS-based scanning subsystem 104 shown in FIG. 1. MEMS-based scanning subsystem 300 includes a light redirecting element 302 and mirror(s) 304. Light redirecting element 302 has a microelectromechanical structure 306 that is configured to perform a scan 352 of the current point 134 over the field of view 130 using the mirror(s) 304. For instance, microelectromechanical structure 306 may perform the scan 352 in response to receipt of the control signal 116. Mirror(s) are configured to reflect the detection beam 126 from the reference location 132 to the current point 134 during the scan 352.

The visible light 124 may define an image that is to be projected onto object(s). Microelectromechanical structure 306 may be configured to project the visible light 124 onto the object(s) using the mirror(s) 304. For instance, microelectromechanical structure 306 may project the visible light 124 onto the object(s) in response to receipt of the control signal 116.

In the presence of moving objects, a Doppler shift may induce a frequency shift in the beat signal that is ambiguous with range determination in the case of a linearly increasing chirp. Rising and falling chirps may be used to cause respective beat frequencies, which may be used to compute both velocity and depth of points in the field of view 130. The average of the beat frequencies represents the distance D between the reference location 132 and the current pixel 134, and the difference between the beat frequencies represents the relative velocity between the points.

Figure 4:
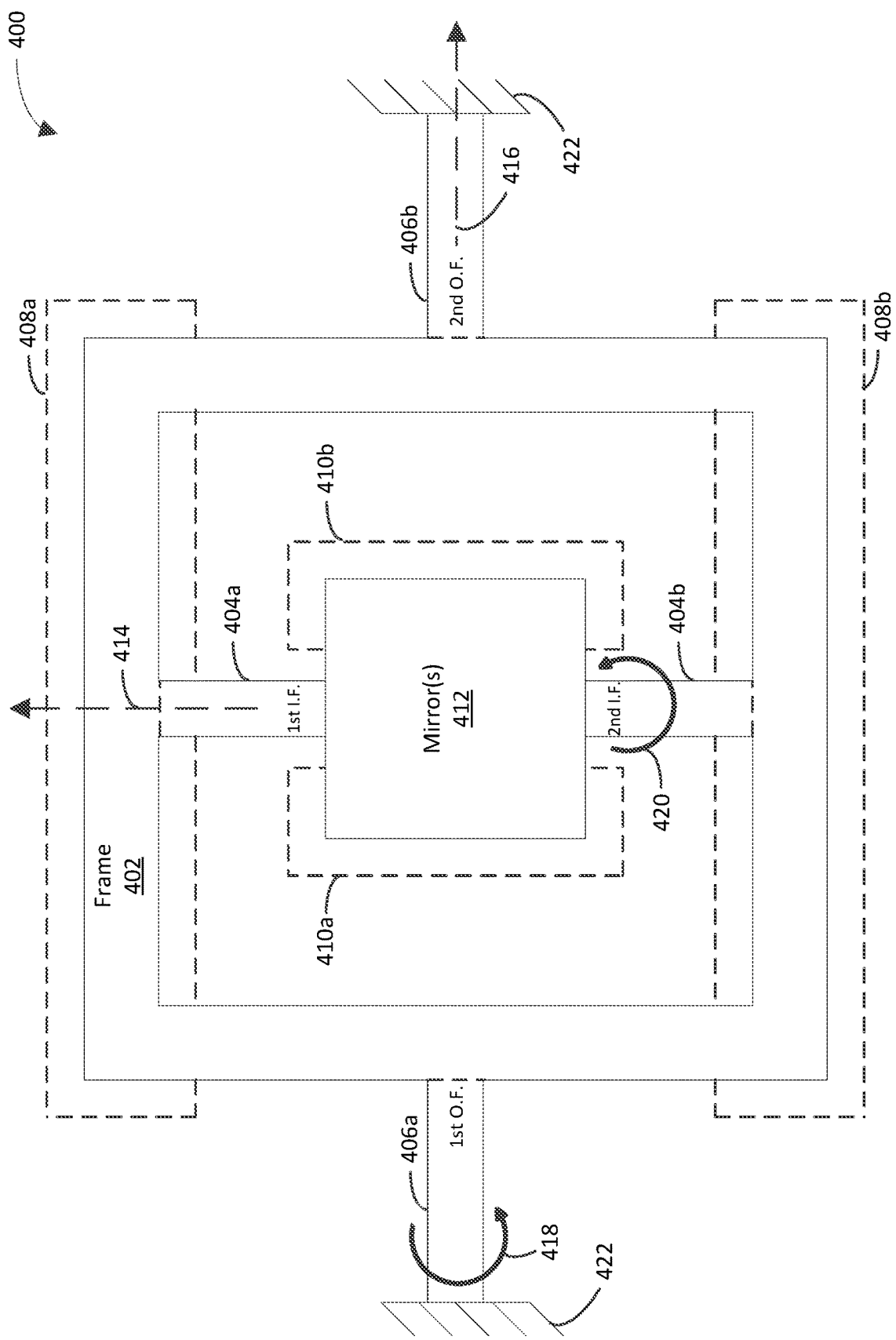
FIG. 4 depicts an example implementation of a microelectromechanical structure shown in FIG. 3 in accordance with an embodiment described herein.

FIG. 4 is a block diagram of an example microelectromechanical structure 400 in accordance with an embodiment described herein. Microelectromechanical structure 400 is an example implementation of a microelectromechanical structure 306 shown in FIG. 3 in accordance with an embodiment. Microelectromechanical structure 400 includes a frame 402, a first inner flexure 404a, a second inner flexure 404b, a first outer flexure 406a, a second outer flexure 406b, a first frame sensing electrode 408a, a second frame sensing electrode 408b, a first mirror sensing electrode 410a, a second mirror sensing electrode 410b, and mirror(s) 412.

Frame 402 provides structural support for inner flexures 404a-404b and mirror(s) 412.

Inner flexures 404a-404b and outer flexures 406a-406b are configured to mount mirror(s) 412. For instance, inner flexures 404a-404b are shown to directly mount mirror(s) 412 via direct contact with mirror(s) 412, and outer flexures 406a-406b are shown to indirectly mount mirror(s) 412 via indirect contact with mirror(s) 412, though the scope of the example embodiments is not limited in this respect. Inner flexures 404a-404b mechanically couple frame 402 to mirror(s) 412. Inner flexures 404a-404b enable mirror(s) 412 to rotate about axis 414, as depicted by arrow 420. Outer flexures 406a-406b mechanically couple frame 402 to a substrate 422. Outer flexures 406a-406b enable frame 402 to rotate about axis 416, as depicted by arrow 418.

Mirror(s) 412 is configured to reflect light (e.g., coherent light) that is incident on mirror(s) 412. The direction in which the light is reflected is based on an extent to which mirror(s) 412 is rotated about axis 414 and an extent to which flame 402 is rotated about axis 416.

Frame sensing electrodes 408a-408b are configured to sense motion of frame 402. For instance, frame sensing electrodes 408a-408b may be configured to sense an extent to which frame 402 rotates clockwise or counterclockwise about the axis 416.

Mirror sensing electrodes 410a-410b are configured to sense motion of mirror(s) 412. For instance, mirror sensing electrodes 410a-410b may be configured to sense an extent to which mirror(s) 412 are rotated clockwise or counterclockwise about the axis 414.

In an example embodiment, inner flexures 404a-404b and outer flexures 406a-406b are used in lieu of spinning elements to mount mirror(s) 412. Accordingly, microelectromechanical structure 400 may not include spinning elements.

In another example embodiment, inner flexures 404a-404b and/or outer flexures 406a-406b are formed from one or more materials having a fracture toughness of at least 15 MPa(m^½) and a Young's modulus of at least 10 Gpa. MPa represents megapascals; GPa represents gigapascals; and m represents meters.

In yet another example embodiment, inner flexures 404a-404b and/or outer flexures 406a-406b are formed from one or more materials capable of undergoing a strain of two percent without failure.

In still another example embodiment, mirror(s) 412 are formed on a substrate material that is different from a material from which inner flexures 404a-404b and/or outer flexures 406a-406b are formed.

In yet another example embodiment, microelectromechanical structure 400 is configured to pivot at least one mirror (e.g., at least one of mirror(s) 412) about one or more axes (e.g., axis 414 and/or axis 416) over an optical field of view greater than a threshold angle. For instance, the threshold angle may be 60 degrees, 70 degrees, 80 degrees, or 90 degrees.

In still another example embodiment, microelectromechanical structure 400 is configured to pivot at least one mirror (e.g., at least one of mirror(s) 412) about one or more axes (e.g., axis 414 and/or axis 416) at a frequency greater than a threshold frequency. For instance, the threshold frequency may be 400 Hz, 500 Hz, 600 Hz, 800 Hz, or 1 kHz.

Microelectromechanical structure 400 may be configured using a 2-axis mirror system, as shown in FIG. 4, or using a pair of single axis mirrors. Selection of the appropriate configuration is based on the application requirements. A 2-axis system may be lower in cost given the reduced assembly requirements; however, a pair of single-axis mirrors may be desirable for a higher performance system given the mirror size and drive frequency requirements.

Microelectromechanical structure 400 may be made from silicon (as are most MEMS structures). However, depending on the application requirements which may include large mirrors, higher scan frequencies, and relatively large fields-of-view, higher performance materials such as alloyed titanium may be used in addition to or in lieu of silicon. In one example, if a titanium alloy is used to make inner flexures 404a-404b and/or outer flexures 406a-406b, the same sheet of material may be used for forming mirror(s) 412. Such material may be polished and coated with a second material to increase reflectivity. In another example, if the application's mirror flatness requirements are relatively high, mirror 412 may be formed on a different substrate than inner flexures 404a-404b and outer flexures 406a-406b and later bonded to inner flexures 404a-404b. One example would be a metal coated piece of silicon bonded to the titanium alloy using a eutectic bond.

A field-of-view of 60 degrees implies a peak-to-peak mechanical deflection of 30 degrees. Given the reflection off of a mirror substrate, the optical field of view is twice the mechanical deflection. Peak deflections of greater than 15 degrees are formidable to achieve using MEMS, especially as the frequency requirements exceed 1 kHz.

Actuation of microelectromechanical structure 400 could take many forms including electrostatic, Lorentz, or piezoelectric based forcing. For a 2-axis microelectromechanical structure fabricated from silicon, electrostatic actuation may be used given the ease of fabrication, though the scope of the example embodiments is not limited in this respect. U.S. Pat. No. 6,753,638 to Adams et al., the entirety of which is incorporated herein by reference, presents such a 2-axis electrostatically actuated mirror system.

The same actuators that were used to drive microelectromechanical structure 400 may be used for sensing the motion of microelectromechanical structure 400. For instance, frame sensing electrodes 408*a* and 408*b* and/or mirror sensing electrodes 410*a* and 410*b* may be used. Frame sensing electrodes 408*a* and 408*b* may be mounted to the floor below frame 402. Assuming frame 402 is made of a conductive material, a carrier signal of approximately 100 kHz and 1 volt peak may be applied to frame 402. Frame sensing electrodes 408*a* and 408*b* may be connected to a differential input trans-impedance amplifier and demodulation circuitry, which are known in the MEMS industry, for sensing the motion of frame 402.

Other example techniques for sensing the motion include optical, Lorentz, piezoelectric, and capacitance-based techniques. For instance, capacitance-based techniques may be relatively simple and have a relatively lower temperature dependence than some other techniques.

Figure 5:
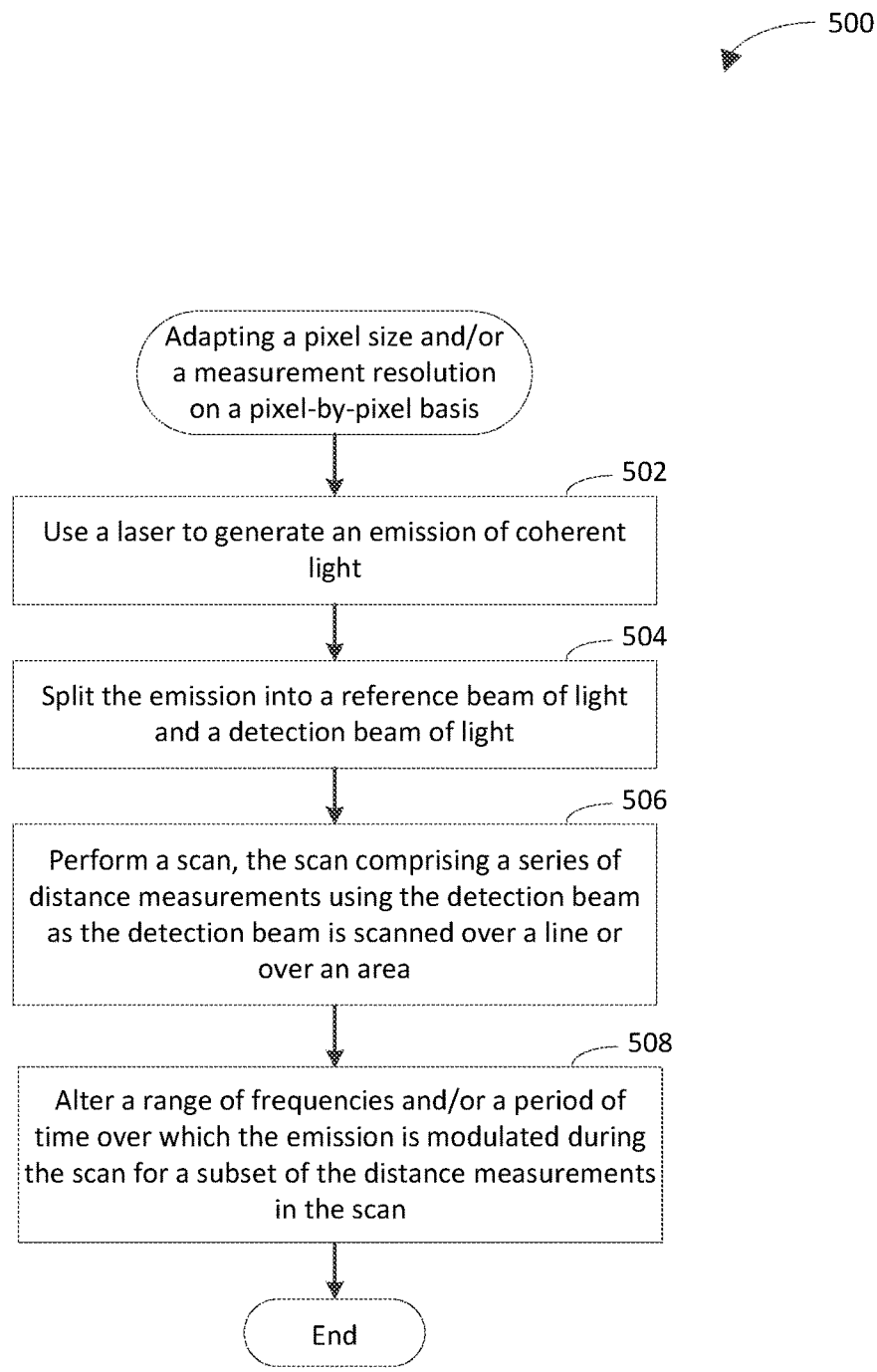
FIG. 5 depicts a flowchart of an example method for adapting a pixel size and/or a measurement resolution on a pixel-by-pixel basis in accordance with an embodiment described herein.

FIG. 5 depicts a flowchart 500 of an example method for adapting a pixel size and/or a measurement resolution on a pixel-by-pixel basis in accordance with an embodiment described herein. For illustrative purposes, flowchart 500 is described with respect to system 100 shown in FIG. 1 and depth measurement subsystem 200 shown in FIG. 2. Further structural and operational embodiments will be apparent to persons skilled in the relevant art(s) based on the discussion regarding flowchart 500.

As shown in FIG. 5, the method of flowchart 500 begins at step 502. In step 502, a laser is used to generate an emission of coherent light. In an example implementation, laser source 202 uses a laser to generate an emission of coherent light 244.

At step 504, the emission is split into a reference beam of light and a detection beam of light. In an example implementation, splitting optics 204 split the emission into a reference beam 246 of light and a detection beam 126 of light.

At step 506, a scan is performed. The scan comprises a series of distance measurements using the detection beam as the detection beam is scanned over a line or over an area. In an example implementation, MEMS-based scanning subsystem 104 performs the scan. In accordance with this implementation, the scan comprises a series of distance measurements using the detection beam 126 as the detection beam 126 is scanned over a line or over an area.

At step 508, a range of frequencies and/or a period of time over which the emission is modulated during the scan are altered for a subset of the distance measurements in the scan. In an example implementation, laser source 202 alters the range of frequencies and/or the period of time over which the emission is modulated during the scan for the subset of the distance measurements in the scan.

In accordance with the embodiment of FIG. 5, the pixel size is a distance over which the detection beam is scanned during a measurement.

In some example embodiments, one or more steps 502, 504, 506, and/or 508 of flowchart 500 may not be performed. Moreover, steps in addition to or in lieu of steps 502, 504, 506, and/or 508 may be performed. For instance, in an example embodiment, the method of flowchart 500 further includes altering the period of time to obtain a specified pixel size at each measurement in a scan. In an aspect of this embodiment, the specified pixel size is a constant pixel size over an entirety of the scan. In an implementation of this aspect, altering the period of time to obtain the specified pixel size at each measurement comprises altering a primary clock of a VCO clock tree within a VCO architecture to enable the signal processing architecture to track a change in the pixel size at each measurement.

In another example embodiment, the method of flowchart 500 further includes altering the range of frequencies to obtain a specified measurement resolution at each measurement in a scan.

Figure 6:
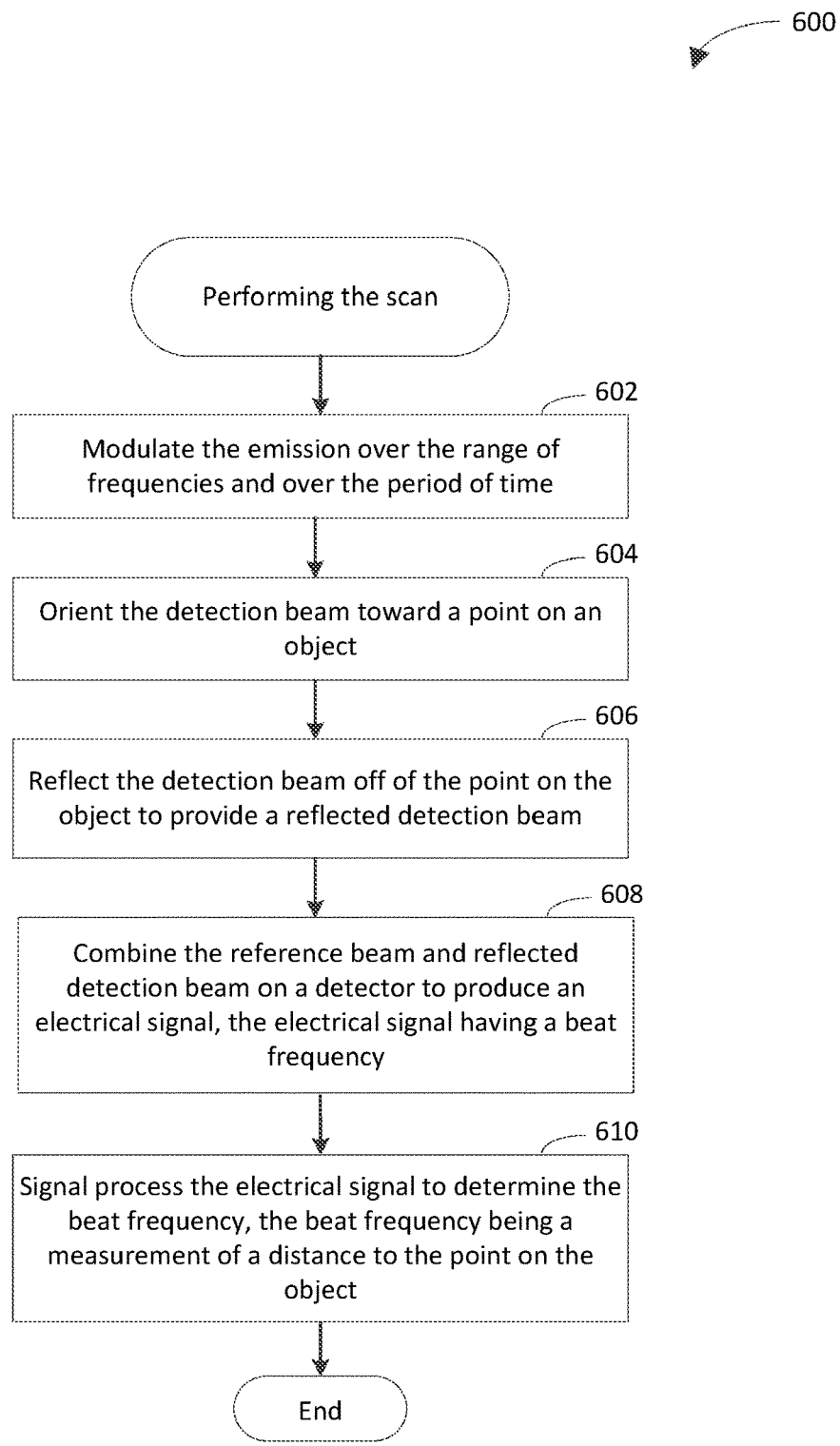
FIG. 6 depicts a flowchart of an example method for performing a scan in accordance with an embodiment described herein.

FIG. 6 depicts a flowchart 600 of an example method for performing a scan in accordance with an embodiment described herein. Flowchart 600 is described as an example implementation of step 506 shown in FIG. 5 for purposes of illustration. For instance, the steps of flowchart 600 may be performed for each distance measurement in the scan. For illustrative purposes, flowchart 600 is described with respect to system 100 shown in FIG. 1 and depth measurement subsystem 200 shown in FIG. 2. Further structural and operational embodiments will be apparent to persons skilled in the relevant art(s) based on the discussion regarding flowchart 600.

As shown in FIG. 6, the method of flowchart 600 begins at step 602. In step 602, the emission is modulated over the range of frequencies and over the period of time. In an example implementation, laser source 202 modulates the emission over the range of frequencies and over the period of time.

At step 604, the detection beam is oriented toward a point on an object. In an example implementation, MEMS-based scanning subsystem 104 orients the detection beam 126 toward a current point 134 on an object 112.

At step 606, the detection beam is reflected off of the point on the object to provide a reflected detection beam. In an example implementation, MEMS-based scanning subsystem 104 reflects the detection beam 126 off of the current point 134 on the object 112 to provide a reflected detection beam 128.

At step 608, the reference beam and reflected detection beam are combined on a detector to produce an electrical signal. The electrical signal has a beat frequency. In an example implementation, light detecting structure 206 combines the reference beam 246 and the reflected detection beam 128 thereon to produce beat signal 248. In accordance with this implementation, the beat signal 248 has the beat frequency.

At step 610, the electrical signal is signal processed to determine the beat frequency. The beat frequency is a measurement of a distance to the point on the object. In an example implementation, signal processing circuit 210 signal processes the beat signal 248 to determine the beat frequency. In accordance with this implementation, the beat frequency is a measurement of a distance to the current point 134 on the object 112.

In some example embodiments, one or more steps 602, 604, 606, 608, and/or 610 of flowchart 600 may not be performed. Moreover, steps in addition to or in lieu of steps 602, 604, 606, 608, and/or 610 may be performed.

Figure 7:
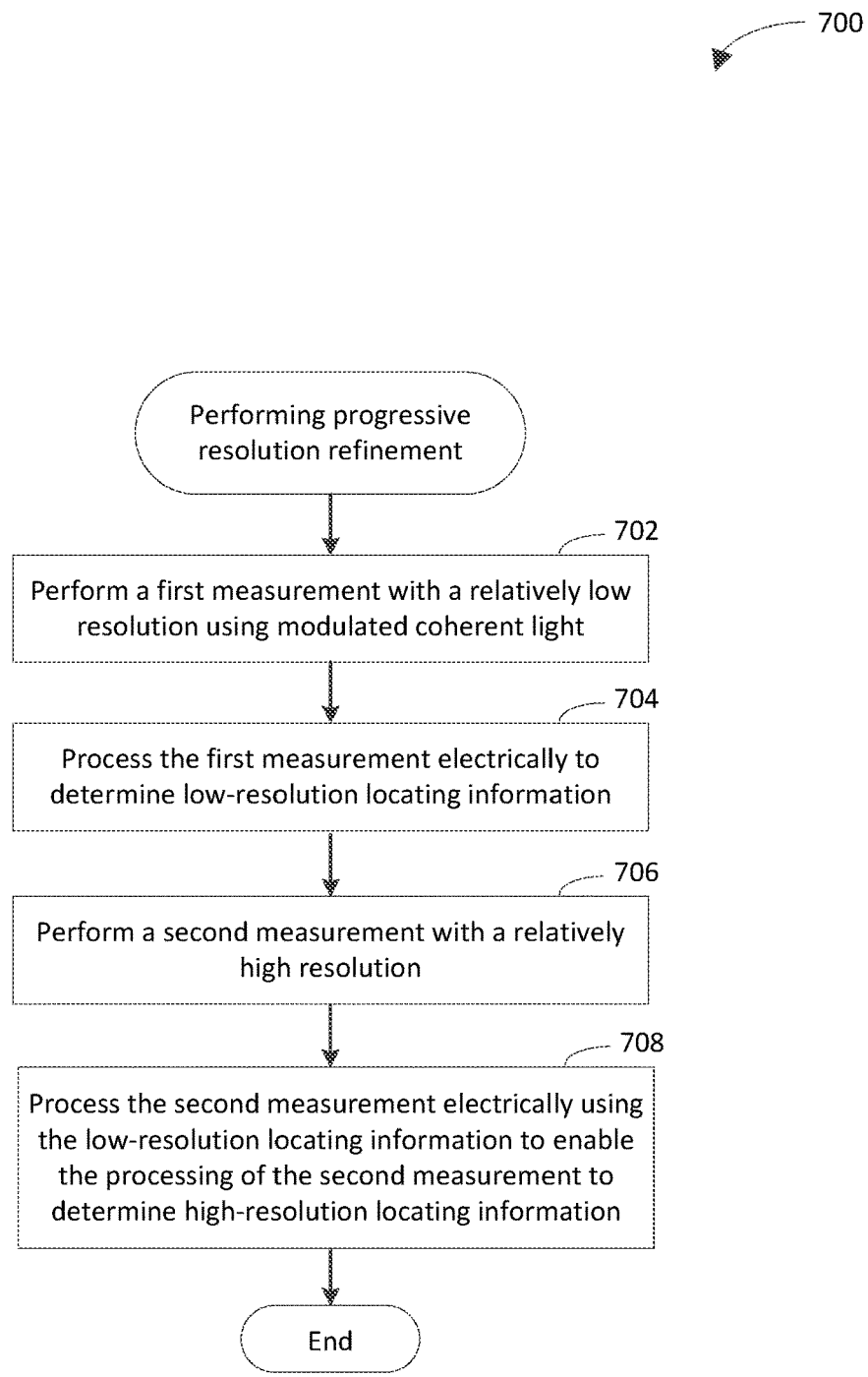
FIGS. 7-9 depict flowcharts of example methods for performing progressive resolution refinement in accordance with embodiments described herein.
Figure 8:
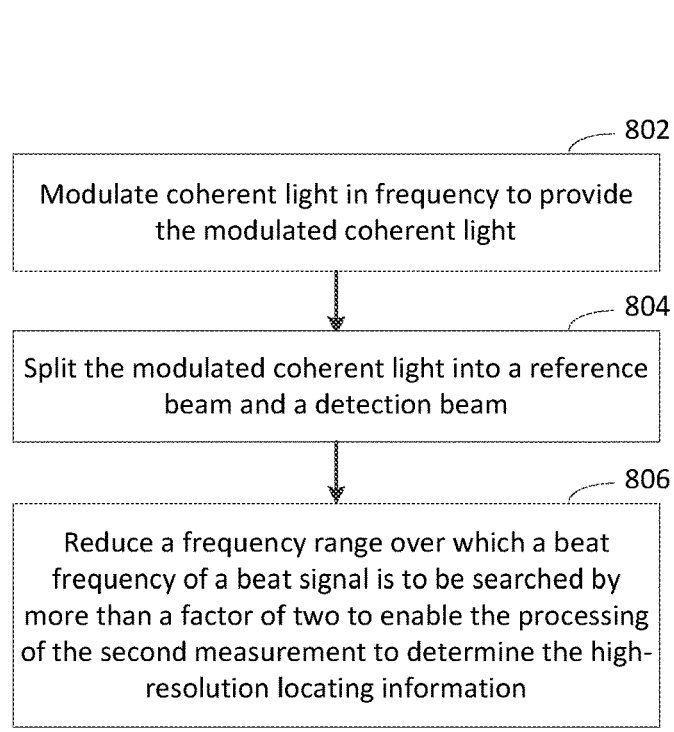
Figure 9:
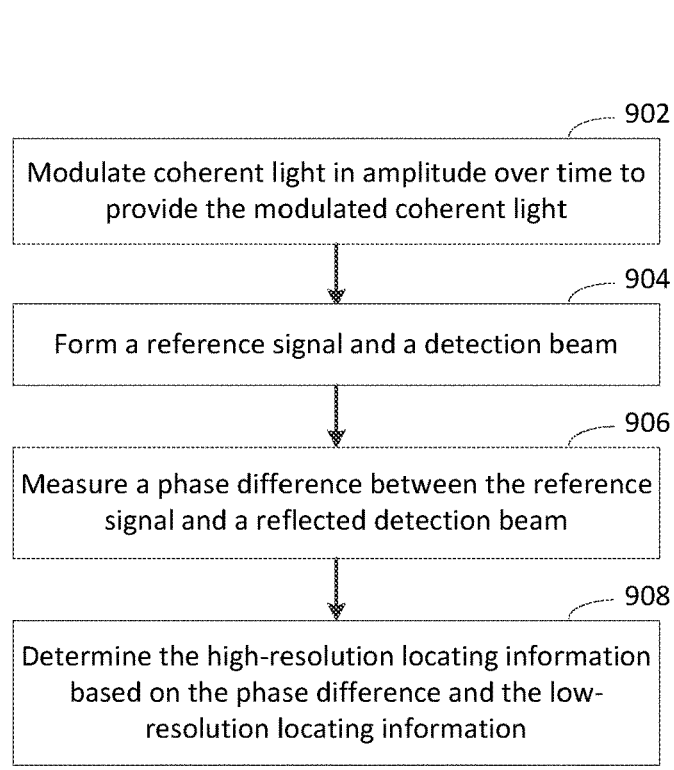
Figure 10:
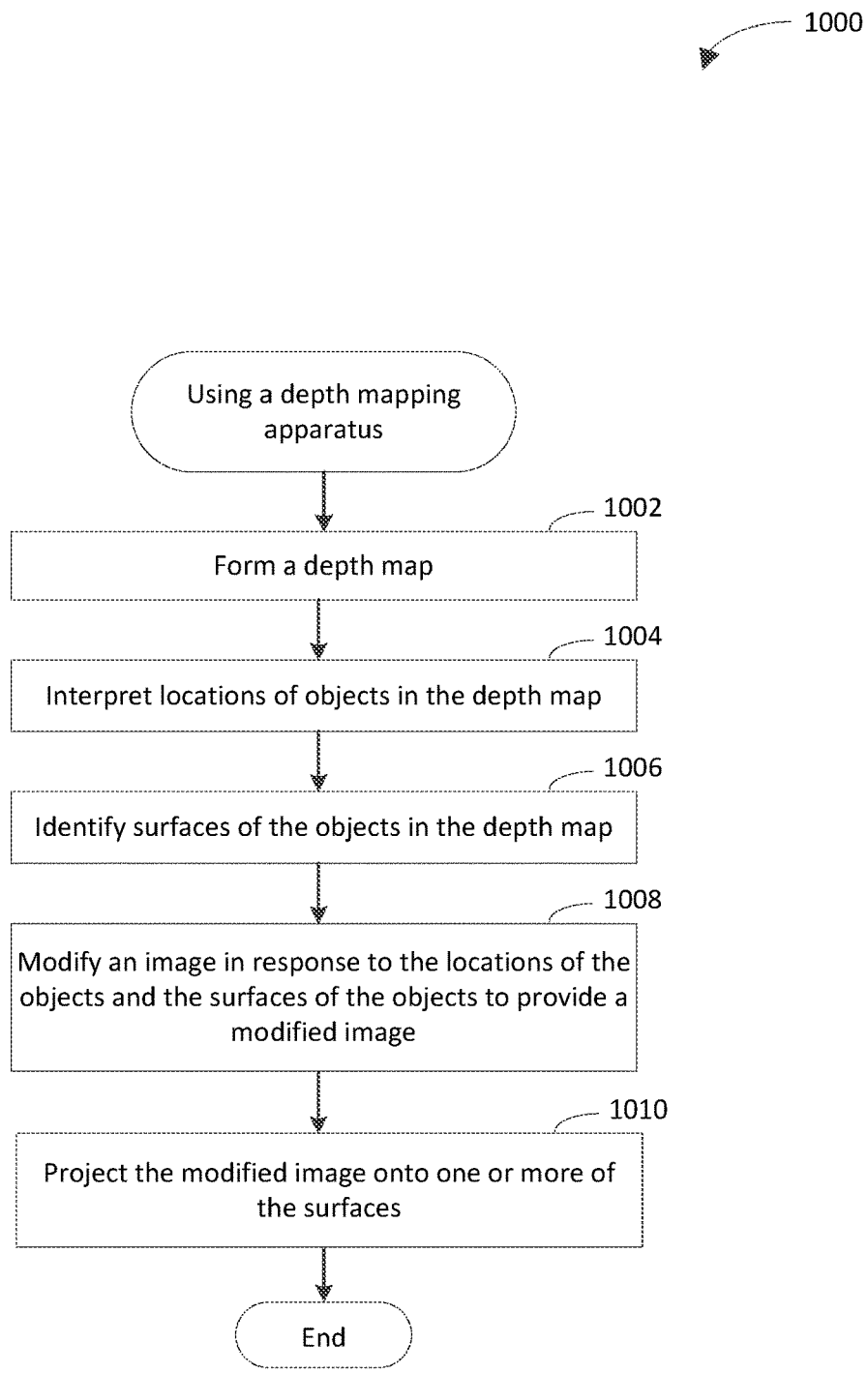
FIG. 10 depicts a flowchart of an example method for using a depth mapping apparatus in accordance with an embodiment described herein.

FIGS. 7-9 depict flowcharts 700 and 800 of example methods for performing progressive resolution refinement in accordance with embodiments described herein. FIG. 10 depicts a flowchart 1000 of an example method for using a depth mapping apparatus in accordance with an embodiment described herein. For illustrative purposes, flowcharts 700, 800, 900, and 1000 are described with respect to system 100 shown in FIG. 1 and depth measurement subsystem 200 shown in FIG. 2. Further structural and operational embodiments will be apparent to persons skilled in the relevant art(s) based on the discussion regarding flowcharts 700, 800, 900, and 1000.

As shown in FIG. 7, the method of flowchart 700 begins at step 702. In step 702, a first measurement with a relatively low resolution is performed using modulated coherent light. In an example implementation, depth measurement subsystem 102 performs the first measurement with the relatively low resolution using the modulated coherent light.

At step 704, the first measurement is processed electrically to determine low-resolution locating information. The low-resolution locating information includes a relatively low resolution estimate of a distance between a reference location and a current point. In an example implementation, signal processing circuit 210 processes the first measurement electrically to determine the low-resolution locating information. In accordance with this embodiment, the low-resolution locating information includes a relatively low resolution estimate of the distance between the reference location 132 and the current point 134.

At step 706, a second measurement with a relatively high resolution is performed. In an example implementation, depth measurement subsystem 102 performs the second measurement with the relatively high resolution.

At step 708, the second measurement is processed electrically using the low-resolution locating information to enable the processing of the second measurement to determine high-resolution locating information. The high-resolution locating information includes a relatively high resolution estimate of the distance between the reference location and the current point. In an example implementation, signal processing circuit 210 processes the second measurement electrically using the low-resolution locating information to enable the processing of the second measurement to determine the high-resolution locating information. In accordance with this implementation, the high-resolution locating information includes a relatively high resolution estimate of the distance between the reference location 132 and the current point 134.

In some example embodiments, one or more steps 702, 704, 706, and/or 708 of flowchart 700 may not be performed. Moreover, steps in addition to or in lieu of steps 702, 704, 706, and/or 708 may be performed. For instance, in an example embodiment, the method of flowchart 700 further includes one or more of the steps shown in flowchart 800 of FIG. 8. As shown in FIG. 8, the method of flowchart 800 begins at step 802. In step 802, coherent light is modulated in frequency to provide the modulated coherent light. In an example implementation, laser source 202 modulates the coherent light 244 in frequency to provide the modulated coherent light.

At step 804, the modulated coherent light is split into a reference beam and a detection beam. In an example implementation, splitting optics 204 split the modulated coherent light into the reference beam 246 and the detection beam 126.

At step 806, a frequency range over which a beat frequency of a beat signal is to be searched is reduced by more than a factor of two to enable the processing of the second measurement to determine the high-resolution locating information. The beat signal is an electrical result of optical mixing of the reference beam and a reflected detection beam at a surface of a light detecting structure. The reflected detection beam results from reflection of the detection beam from the current point. In an example implementation, depth measurement subsystem 102 reduces the frequency range over which the beat frequency of the beat signal is to be searched by more than a factor of two to enable the processing of the second measurement to determine the high-resolution locating information.

In another example embodiment, the method of flowchart 700 further includes one or more of the steps shown in flowchart 900 of FIG. 9. As shown in FIG. 9, the method of flowchart 900 begins at step 902. In step 902, coherent light is modulated in amplitude over time to provide the modulated coherent light. In an example implementation, laser source 202 modulates the coherent light 244 in amplitude over time to provide the modulated coherent light.

At step 904, a reference signal and a detection beam are formed. The detection beam is formed from the modulated coherent light. In an example implementation, depth measurement subsystem 102 forms the reference signal 248A and the detection beam 126. In accordance with this implementation, the detection beam 126 is formed from the modulated coherent light.

At step 906, a phase difference between the reference signal and a reflected detection beam is measured. The reflected detection beam results from reflection of the detection beam from the current point. In an example implementation, depth measurement subsystem 102 measures a phase difference between the reference signal 248A and the reflected detection beam 128.

At step 908, the high-resolution locating information is determined based on the phase difference and the low-resolution locating information. In an example implementation, depth measurement subsystem 102 determines the high-resolution locating information based on the phase difference and the low-resolution locating information.

As shown in FIG. 10, the method of flowchart 1000 begins at step 1002. In step 1002, a depth map is formed. In an example implementation, controller 108 forms the depth map 138. For instance, controller 108 may form the depth map 138 based on a scan of a beam of laser light from the reference location 132 over points (e.g., a grid of points) in the field of view 130.

At step 1004, locations of objects in the depth map are interpreted. In an example implementation, controller 108 interprets the locations of the objects in the depth map 138. For instance, measured distances from the reference location 132 to respective points in the field of view 130 may indicate the locations of the objects in the depth map 138. Accordingly, controller 108 may use the measured distances to interpret the locations of the objects in the depth map 138.

At step 1006, surfaces of the objects in the depth map are identified. For example, the surfaces of the objects may be interpreted based at least in part on the locations of the objects. In accordance with this example, interpolation between points that correspond to the locations of the objects may be performed to identify the surfaces of the objects in the depth map. In an example implementation, controller 108 identifies the surfaces of the objects in the depth map 138.

At step 1008, an image is modified in response to the locations of the objects and the surfaces of the objects to provide a modified image. In an example implementation, controller 108 and/or laser projection subsystem 106 modifies the image in response to the locations of the objects and the surfaces of the objects to provide the modified image.

At step 1010, the modified image is projected onto one or more of the surfaces. In an example implementation, laser projection subsystem 106 projects the modified image onto the one or more surfaces. For instance, laser projection subsystem 106 may use a light redirecting element in MEMS-based scanning subsystem 104 to project the modified image onto the one or more surfaces.

In some example embodiments, one or more steps 1002, 1004, 1006, 1008, and/or 1010 of flowchart 1000 may not be performed. Moreover, steps in addition to or in lieu of steps 1002, 1004, 1006, 1008, and/or 1010 may be performed.

III. Example Computing System Implementation

Figure 11:
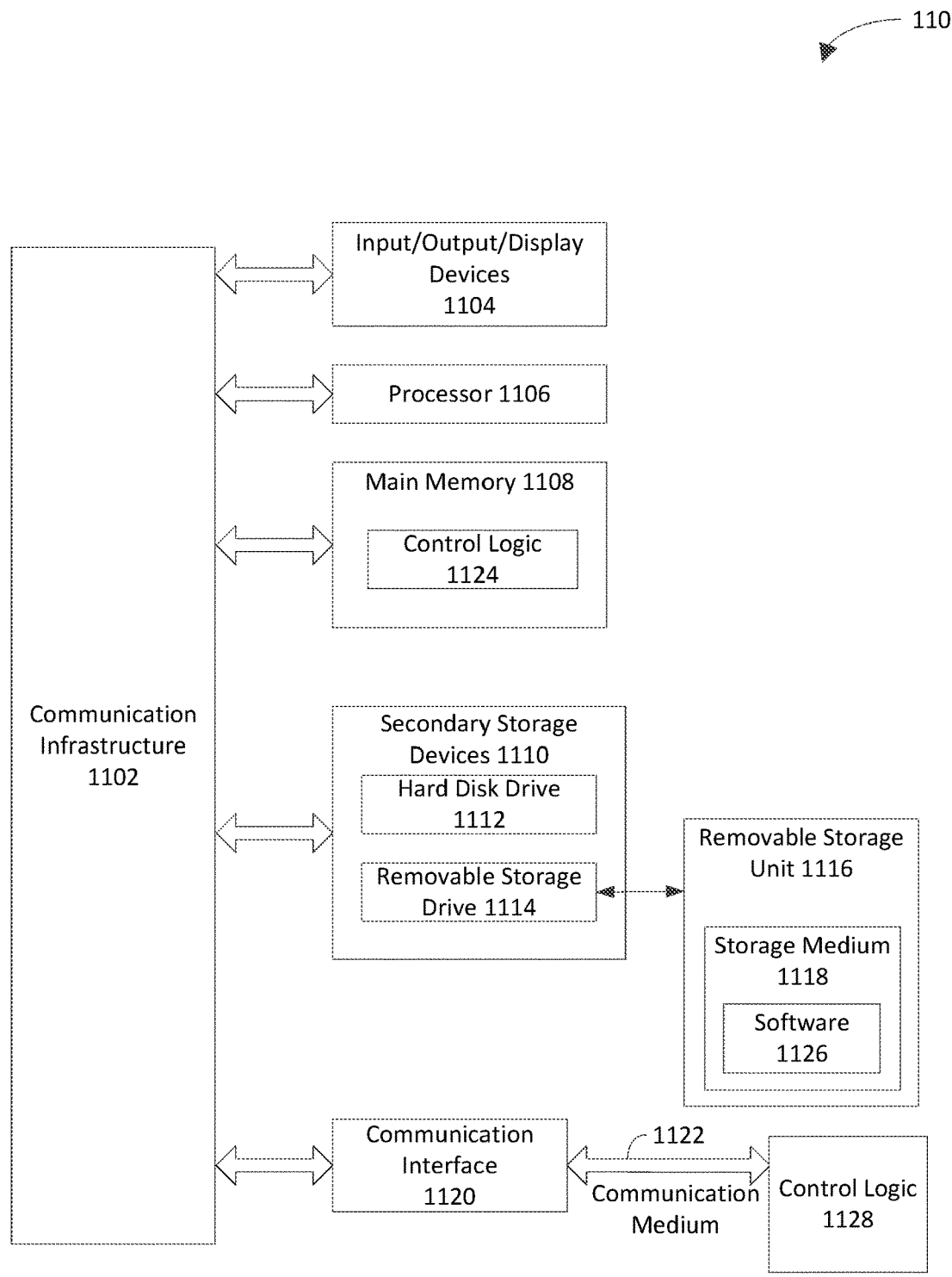
FIG. 11 is a block diagram of a computing system that may be used to implement various embodiments.

Example embodiments, systems, components, subcomponents, devices, methods, flowcharts, steps, and/or the like described herein, including but not limited to flowchart 500, flowchart 600, flowchart 700, flowchart 800, flowchart 900, and flowchart 1000 may be implemented in hardware (e.g., hardware logic/electrical circuitry), or any combination of hardware with software (computer program code configured to be executed in one or more processors or processing devices) and/or firmware. The embodiments described herein, including systems, methods/processes, and/or apparatuses, may be implemented using well known computing devices, such as computer 1100 shown in FIG. 11. For example, each of the steps of flowchart 500, each of the steps of flowchart 600, each of the steps of flowchart 700, each of the steps of flowchart 800, each of the steps of flowchart 900, and each of the steps of flowchart 1000 may be implemented using one or more computers 1100.

Computer 1100 can be any commercially available and well known communication device, processing device, and/or computer capable of performing the functions described herein, such as devices/computers available from International Business Machines®, Apple®, HP®, Dell®, Cray®, Samsung®, Nokia®, etc. Computer 1100 may be any type of computer, including a server, a desktop computer, a laptop computer, a tablet computer, a wearable computer such as a smart watch or a head-mounted computer, a personal digital assistant, a cellular telephone, etc.

Computer 1100 includes one or more processors (also called central processing units, or CPUs), such as a processor 1106. Processor 1106 is connected to a communication infrastructure 1102, such as a communication bus. In some embodiments, processor 1106 can simultaneously operate multiple computing threads. Computer 1100 also includes a primary or main memory 1108, such as random access memory (RAM). Main memory 1108 has stored therein control logic 1124 (computer software), and data.

Computer 1100 also includes one or more secondary storage devices 1110. Secondary storage devices 1110 include, for example, a hard disk drive 1112 and/or a removable storage device or drive 1114, as well as other types of storage devices, such as memory cards and memory sticks. For instance, computer 1100 may include an industry standard interface, such a universal serial bus (USB) interface for interfacing with devices such as a memory stick. Removable storage drive 1114 represents a floppy disk drive, a magnetic tape drive, a compact disk drive, an optical storage device, tape backup, etc.

Removable storage drive 1114 interacts with a removable storage unit 1116. Removable storage unit 1116 includes a computer useable or readable storage medium 1118 having stored therein computer software 1126 (control logic) and/or data. Removable storage unit 1116 represents a floppy disk, magnetic tape, compact disk (CD), digital versatile disc (DVD), Blu-ray disc, optical storage disk, memory stick, memory card, or any other computer data storage device. Removable storage drive 1114 reads from and/or writes to removable storage unit 1116 in a well-known manner.

Computer 1100 also includes input/output/display devices 1104, such as touchscreens, LED and LCD displays, keyboards, pointing devices, etc.

Computer 1100 further includes a communication or network interface 1120. Communication interface 1120 enables computer 1100 to communicate with remote devices. For example, communication interface 1120 allows computer 1100 to communicate over communication networks or mediums 1122 (representing a form of a computer useable or readable medium), such as local area networks (LANs), wide area networks (WANs), the Internet, etc. Network interface 1120 may interface with remote sites or networks via wired or wireless connections. Examples of communication interface 1120 include but are not limited to a modem (e.g., for 3G and/or 4G communication(s)), a network interface card (e.g., an Ethernet card for Wi-Fi and/or other protocols), a communication port, a Personal Computer Memory Card International Association (PCMCIA) card, a wired or wireless USB port, etc. Control logic 1128 may be transmitted to and from computer 1100 via the communication medium 1122.

Any apparatus or manufacture comprising a computer useable or readable medium having control logic (software) stored therein is referred to herein as a computer program product or program storage device. Examples of a computer program product include but are not limited to main memory 1108, secondary storage devices 1110 (e.g., hard disk drive 1112), and removable storage unit 1116. Such computer program products, having control logic stored therein that, when executed by one or more data processing devices, cause such data processing devices to operate as described herein, represent embodiments. For example, such computer program products, when executed by processor 1106, may cause processor 1106 to perform any of the steps of flowchart 500 of FIG. 5, flowchart 600 of FIG. 6, flowchart 700 of FIG. 7, flowchart 800 of FIG. 8, flowchart 900 of FIG. 9, and/or flowchart 1000 of FIG. 10.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to media (e.g., non-transitory media) such as the hard disk associated with a hard disk drive, a removable magnetic disk, a removable optical disk (e.g., CD ROMs, DVD ROMs, etc.), zip disks, tapes, magnetic storage devices, optical storage devices, MEMS-based storage devices, nanotechnology-based storage devices, as well as other media such as flash memory cards, digital video discs, RAM devices, ROM devices, and the like. Such computer-readable storage media may store program modules that include computer program logic to implement, for example, embodiments, systems, components, subcomponents, devices, methods, flowcharts, steps, and/or the like described herein (as noted above), and/or further embodiments described herein. Embodiments are directed to computer program products comprising such logic (e.g., in the form of program code, instructions, or software) stored on any computer useable medium. Such program code, when executed in one or more processors, causes a device to operate as described herein.

Note that such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

The disclosed technologies can be put into practice using software, firmware, and/or hardware implementations other than those described herein. Any software, firmware, and hardware implementations suitable for performing the functions described herein can be used.

IV. Conclusion

While various embodiments have been described above, it should be understood that they have been presented by way of example only, and not limitation. It will be apparent to persons skilled in the relevant art that various changes in form and detail can be made therein without departing from the scope of the embodiments. Thus, the scope of the embodiments should not be limited by any of the above-described exemplary embodiments, but should be defined only in accordance with the following claims and their equivalents.

What is claimed is:

1. A method of performing progressive resolution refinement, the method comprising:
   performing a periodic chirp in which coherent light is modulated in frequency over a chirp period of time to provide modulated coherent light;
   modulating an emission frequency of the modulated coherent light to provide frequency modulation changes in a range from 150 megahertz to 150 gigahertz;
   performing a first measurement with a relatively low resolution using the modulated coherent light;
   processing the first measurement electrically to determine low-resolution locating information, the low-resolution locating information including a relatively low resolution estimate of a distance between a reference location and a current point;
   performing a second measurement with a relatively high resolution; and
   processing the second measurement electrically using the low-resolution locating information to enable the processing of the second measurement to determine high-resolution locating information, the high-resolution locating information including a relatively high resolution estimate of the distance between the reference location and the current point.

2. The method of claim 1, further comprising:
   splitting the modulated coherent light into a reference beam and a detection beam; and
   reducing a frequency range over which a beat frequency of a beat signal is to be searched by more than a factor of two to enable the processing of the second measurement to determine the high-resolution locating information, the beat signal being an electrical result of optical mixing of the reference beam and a reflected detection beam at a surface of a light detecting structure, the reflected detection beam resulting from reflection of the detection beam from the current point.

3. The method of claim 1, further comprising:
   modulating the coherent light in amplitude over time to provide amplitude-modulated coherent light;
   forming a reference signal and a detection beam, the detection beam formed from the amplitude-modulated coherent light;
   measuring a phase difference between the reference signal and a reflected detection beam, the reflected detection beam resulting from reflection of the detection beam from the current point; and
   determining the high-resolution locating information based on the phase difference and the low-resolution locating information.

4. The method of claim 1, further comprising:
   performing a scan of the current point in an environment using a mirror; and
   forming a depth map by coordinating the high-resolution locating information with the scan of the current point in the environment, wherein the depth map is a graphical three-dimensional representation of the environment.

5. The method of claim 4, further comprising:
   performing laser projection by projecting a two-dimensional image, which is based on the depth map, onto an object in the environment.

6. The method of claim 1, further comprising:
   determining Doppler velocity of a point, which corresponds to the current point at a designated period of time, based on the high-resolution locating information.

7. The method of claim 1, wherein the first measurement is a measurement of another point rather than the current point.

8. The method of claim 1, further comprising:
   adjusting a range of frequencies over which the coherent light is modulated during the periodic chirp to adapt resolution of the high-resolution locating information.

9. A system to perform progressive resolution refinement, the system comprising:
   a laser source configured to perform a periodic chirp in which coherent light is modulated in frequency over a chirp period of time to provide modulated coherent light, the laser source further configured to modulate an emission frequency of the modulated coherent light to provide frequency modulation changes in a range from 150 megahertz to 150 gigahertz;
   a depth measurement subsystem configured to perform a first measurement with a relatively low resolution using the modulated coherent light, the depth measurement subsystem further configured to performing a second measurement with a relatively high resolution; and
   a signal processing circuit configured to process the first measurement electrically to determine low-resolution locating information, the low-resolution locating information including a relatively low resolution estimate of a distance between a reference location and a current point, the signal processing circuit further configured to processing the second measurement electrically using the low-resolution locating information to enable the processing of the second measurement to determine high-resolution locating information, the high-resolution locating information including a relatively high resolution estimate of the distance between the reference location and the current point.

10. The system of claim 9, further comprising:
splitting optics configured to split the modulated coherent light into a reference beam and a detection beam;
wherein the depth measurement subsystem is configured to reduce a frequency range over which a beat frequency of a beat signal is to be searched by more than a factor of two to enable the processing of the second measurement to determine the high-resolution locating information, the beat signal being an electrical result of optical mixing of the reference beam and a reflected detection beam at a surface of a light detecting structure, the reflected detection beam resulting from reflection of the detection beam from the current point.

11. The system of claim 9, further comprising:
a microelectromechanical systems-based scanning subsystem configured to perform a scan of the current point in an environment using a mirror; and
a controller configured to form a depth map by coordinating the high-resolution locating information with the scan of the current point in the environment, wherein the depth map is a graphical three-dimensional representation of the environment.

12. The system of claim 11, further comprising:
a laser projection subsystem configured to perform laser projection by projecting a two-dimensional image, which is based on the depth map, onto an object in the environment.

13. The system of claim 9, further comprising:
a controller configured to determine Doppler velocity of a point, which corresponds to the current point at a designated period of time, based on the high-resolution locating information.

14. The system of claim 9, wherein the first measurement is a measurement of another point rather than the current point.

15. The system of claim 9, further comprising:
a reference fiber optic loop; and
a controller configured to calibrate the depth measurement subsystem using a measurement of a distance through the reference fiber optic loop, the distance through the reference fiber optic loop being a known distance.

16. The system of claim 9, further comprising:
a controller configured to adjust a range of frequencies over which the coherent light is modulated during the periodic chirp to adapt resolution of the high-resolution locating information.

17. A method of performing progressive resolution refinement, the method comprising:
modulating coherent light in frequency to provide modulated coherent light;
splitting the modulated coherent light into a reference beam and a detection beam;
performing a first measurement with a relatively low resolution using the modulated coherent light;
processing the first measurement electrically to determine low-resolution locating information, the low-resolution locating information including a relatively low resolution estimate of a distance between a reference location and a current point;
performing a second measurement with a relatively high resolution;
processing the second measurement electrically using the low-resolution locating information to enable the processing of the second measurement to determine high-resolution locating information, the high-resolution locating information including a relatively high resolution estimate of the distance between the reference location and the current point; and
reducing a frequency range over which a beat frequency of a beat signal is to be searched by more than a factor of two to enable the processing of the second measurement to determine the high-resolution locating information, the beat signal being an electrical result of optical mixing of the reference beam and a reflected detection beam at a surface of a light detecting structure, the reflected detection beam resulting from reflection of the detection beam from the current point.

18. The method of claim 17, further comprising:
performing a scan of the current point in an environment using a mirror; and
forming a depth map by coordinating the high-resolution locating information with the scan of the current point in the environment, wherein the depth map is a graphical three-dimensional representation of the environment.

19. The method of claim 18, further comprising:
performing laser projection by projecting a two-dimensional image, which is based on the depth map, onto an object in the environment.

20. The method of claim 17, wherein modulating the coherent light comprises:
performing a periodic chirp in which the coherent light is modulated in frequency over a chirp period of time to provide the modulated coherent light; and
wherein the method further comprises:
adjusting a range of frequencies over which the coherent light is modulated during the periodic chirp to adapt resolution of the high-resolution locating information.

* * * * *